(12) United States Patent
Park et al.

(10) Patent No.: US 12,724,233 B2
(45) Date of Patent: Sep. 1, 2026

(54) CAMERA MODULE AND VEHICLE COMPRISING SAME

(71) Applicant: LG INNOTEK CO., LTD., Seoul (KR)

(72) Inventors: Sung Jin Park, Seoul (KR); Ki Cheol Kim, Seoul (KR); Se Yeon Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 290 days.

(21) Appl. No.: 18/559,208

(22) PCT Filed: May 6, 2022

(86) PCT No.: PCT/KR2022/006483
§ 371 (c)(1),
(2) Date: Nov. 6, 2023

(87) PCT Pub. No.: WO2022/235108
PCT Pub. Date: Nov. 10, 2022

(65) Prior Publication Data

US 2024/0231048 A1 Jul. 11, 2024

(30) Foreign Application Priority Data

May 6, 2021 (KR) ........................ 10-2021-0058854
Aug. 23, 2021 (KR) ........................ 10-2021-0111247

(51) Int. Cl.
*G02B 13/00* (2006.01)
*G02B 7/02* (2021.01)
*G03B 17/02* (2021.01)

(52) U.S. Cl.
CPC ......... *G02B 13/0035* (2013.01); *G02B 7/021* (2013.01); *G02B 13/008* (2013.01); *G03B 17/02* (2013.01)

(58) Field of Classification Search
CPC ...... G02B 13/0035; G02B 7/028; G02B 7/02; G02B 7/021; G02B 7/022; G02B 7/023; G02B 7/025; G02B 7/026
See application file for complete search history.

(56) References Cited

U.S. PATENT DOCUMENTS 7,031,079 B2 4/2006 Isono
7,420,609 B2 9/2008 Yamaguchi et al.
(Continued)

FOREIGN PATENT DOCUMENTS

CN 111263910 A 6/2020
JP 9-304718 A 11/1997
(Continued)

OTHER PUBLICATIONS

Office Action dated Sep. 26, 2023 in Korean Application No. 10-2021-0111247.
(Continued)

*Primary Examiner* — Ephrem Z Mebrahtu
(74) *Attorney, Agent, or Firm* — SALIWANCHIK, LLOYD & EISENSCHENK

(57) ABSTRACT

The camera module disclosed in the embodiment of the invention includes a lens barrel having a through hole therein; and first, second and third lenses coupled to the through hole of the lens barrel and aligned with an optical axis from an object side to a sensor side. The materials of the first and second lenses are different, a refractive index of the second lens is lower than a refractive index of the first lens, the second lens includes a flange portion extending from the optical axis toward an inner surface of the lens barrel, and a length of a first contact surface in which the flange portion of the second lens contacts the inner surface of the lens barrel is 20% to 50% of a thickness of the flange portion. An object-side third surface and a sensor-side fourth surface of the second lens have different radii of curvature on the
(Continued)

optical axis, and a center of the first contact surface where the flange portion of the second lens contacts the inner surface of the lens barrel may be located closer to a side having a greater radius of curvature among the third surface and the fourth surface based on a center of the thickness of the flange portion.

20 Claims, 14 Drawing Sheets

(56) References Cited

U.S. PATENT DOCUMENTS

| | | | | |
|---|---|---|---|---|
| 11,347,018 | B2 | 5/2022 | Wang | |
| 11,768,317 | B2 | 9/2023 | Suginome et al. | |
| 12,366,683 | B2 | 7/2025 | Suginome et al. | |
| 12,366,730 | B2 | 7/2025 | Lin et al. | |
| 2004/0105167 | A1 | 6/2004 | Isono | |
| 2008/0174886 | A1* | 7/2008 | Sato | G02B 13/18 359/754 |
| 2012/0287515 | A1* | 11/2012 | Hsu | G02B 13/0045 359/708 |
| 2013/0050850 | A1* | 2/2013 | Lin | G02B 7/021 359/738 |
| 2016/0178874 | A1 | 6/2016 | Kim | |
| 2019/0049737 | A1 | 2/2019 | Terai et al. | |
| 2019/0278048 | A1 | 9/2019 | Kanzaki | |
| 2020/0096723 | A1 | 3/2020 | Furutake | |
| 2020/0209543 | A1 | 7/2020 | Kim et al. | |
| 2021/0011198 | A1 | 1/2021 | Suginome et al. | |
| 2022/0100057 | A1* | 3/2022 | Su | G02B 7/025 |
| 2022/0196963 | A1 | 6/2022 | Suginome et al. | |
| 2022/0236520 | A1* | 7/2022 | Yokoyama | H04N 13/239 |
| 2023/0384483 | A1 | 11/2023 | Suginome et al. | |
| 2025/0334719 | A1 | 10/2025 | Suginome et al. | |

FOREIGN PATENT DOCUMENTS

| | | | |
|---|---|---|---|
| JP | 2002-341243 | A | 11/2002 |
| JP | 2004-163786 | A | 6/2004 |
| JP | 2016-188894 | A | 11/2016 |
| JP | 2018-146878 | A | 9/2018 |
| JP | 2018-197820 | A | 12/2018 |
| JP | 2019-197231 | A | 11/2019 |
| JP | 2020-27295 | A | 2/2020 |
| JP | 2020-52177 | A | 4/2020 |
| KR | 10-2016-0034875 | A | 3/2016 |
| KR | 10-2016-0076843 | A | 7/2016 |
| KR | 10-2021-0044552 | A | 4/2021 |
| TW | 200710533 | A | 3/2007 |
| WO | 2020/218212 | A1 | 10/2020 |
| WO | 2021/004148 | A1 | 1/2021 |

OTHER PUBLICATIONS

Supplementary European Search Report dated Apr. 1, 2025 in European Application No. 22799151.0.

International Search Report dated Aug. 12, 2022 in International Application No. PCT/KR2022/006483.

European Search Report dated Dec. 2, 2025 in European Application No. 25201065.7.

Office Action dated Feb. 3, 2026 in Japanese Application No. 2023-568365.

Office Action dated Mar. 10, 2026 in Korean Application No. 10-2025-0196454.

Office Action dated Mar. 12, 2026 in Taiwanese Application No. 111117212.

* cited by examiner

CAMERA MODULE AND VEHICLE COMPRISING SAME

CROSS-REFERENCE TO RELATED APPLICATIONS

This application is the U.S. national stage application of International Patent Application No. PCT/KR2022/006483, filed May 6, 2022, which claims the benefit under 35 U.S.C. § 119 of Korean Application Nos. 10-2021-0058854, filed May 6, 2021; and 10-2021-0111247, filed Aug. 23, 2021; the disclosures of each of which are incorporated herein by reference in their entirety.

TECHNICAL FIELD

An embodiment of the invention relates to a camera module and a vehicle having the same.

BACKGROUND ART

ADAS (Advanced Driving Assistance System) is an advanced driver assistance system for assisting a driver to drive and is configured to sense the situation ahead, determine the situation based on the sensed result, and control the behavior of the vehicle based on the situation determination. For example, the ADAS sensor device detects a vehicle ahead and recognizes a lane. Then, when the target lane or target speed and the target in front are determined, the vehicle's ESC (Electrical Stability Control), EMS (Engine Management System), MDPS (Motor Driven Power Steering), etc. are controlled. Typically, ADAS may be implemented as an automatic parking system, a low-speed city driving assistance system, a blind spot warning system, and the like. The sensor devices for sensing the forward situation in ADAS are a GPS sensor, a laser scanner, a front radar, and a lidar, and the line, and the most representative sensor device is a front camera for photographing the front of the vehicle.

In recent years, research on a sensing system for sensing the surroundings of a vehicle has been accelerated for the safety and convenience of a driver. Vehicle sensing systems are used for various purposes, such as inhibiting collisions with objects that the driver did not recognize by detecting objects around the vehicle, as well as performing automatic parking by detecting empty spaces and provide the the most essential data for vehicle automatic control. As for such a detection system, a method using a radar signal and a method using a camera are commonly used. The vehicle camera module is used to be built-in front and rear surveillance cameras and black boxes in a vehicle, and takes a picture or a video of the subject. Since the vehicle camera module is exposed to the outside, a photographic quality may be deteriorated due to moisture and temperature. In particular, the camera module has a problem in that the optical properties change depending on the ambient temperature and the material of the lens.

DISCLOSURE

Technical Problem

An embodiment of the invention may provide a camera module having a new lens optical system.

Embodiments of the invention may provide a camera module having at least one thermal compensation lens among the lenses. An embodiment of the invention may provide a camera module for reducing thermal strain through a contact characteristic between a flange portion of at least one of the lenses and an inner surface of the lens barrel. An embodiment of the invention may provide a mobile terminal having a camera module and a mobile device such as a vehicle.

Technical Solution

A camera module according to an embodiment of the invention includes: a lens barrel having a through hole therein; and a first lens, a second lens and a third lens coupled to the through hole of the lens barrel and aligned with an optical axis from an object side to a sensor side, wherein a material of the second lens and a material of the first lens are different, wherein a refractive index of the second lens is lower than a refractive index of the first lens, the second lens includes a flange portion extending from the optical axis toward an inner surface of the lens barrel, and a length of a first contact surface in which the flange portion of the second lens contacts the inner surface of the lens barrel is 20% to 50% of a thickness of the flange portion, and an object-side third surface and a sensor-side fourth surface of the second lens have different radii of curvature on the optical axis, and a center of the first contact surface where the flange portion of the second lens contacts the inner surface of the lens barrel may be located closer to a side having a greater radius of curvature among the third surface and the fourth surface based on a center of the thickness of the flange portion.

According to an embodiment of the invention, the center of the first contact surface may be located closer to the object side than a center of the flange portion of the second lens. A difference in radius of curvature between the third surface and the fourth surface may be 1 mm or more. The radius of curvature of the third surface may be greater than the radius of curvature of the fourth surface, and the center of the first contact surface may be located closer to the object side than a center of the flange portion of the second lens.

According to an embodiment of the invention, the first to third lenses are spaced apart from each other, and may be applied to an infrared camera. A diameter of the first lens may be smaller than a diameter of the second lens.

According to an embodiment of the invention, the camera module is applied to a driver monitoring camera. An angle of view of the camera module may range from 50 degrees to 70 degrees.

According to an embodiment of the invention, the thickness of the flange portion of the second lens is a distance between an object-side surface of the flange portion of the second lens and a sensor-side surface of the flange portion of the second lens, and the distance is a distance parallel to the optical axis, and the object-side surface and the sensor-side surface of the flange portion may be a surface in contact with a spacing member or a light blocking film.

A camera module according to an embodiment of the invention includes: a lens barrel having a through hole therein; and a first lens, a second lens and a third lens coupled to the through hole of the lens barrel and aligned with an optical axis from an object side to an sensor side, wherein a material of the second lens and a material of the first lens are different, wherein a refractive index of the second lens is lower than a refractive index of the first lens, the second lens includes a flange portion extending from the optical axis toward an inner surface of the lens barrel, and the flange portion of the second lens may include a first contact surface in contact with the lens barrel, and a length of the first contact surface may be 20% to 50% of a thickness of the flange portion, and a rate of change of a MTF at high temperature compared to room temperature may be 10% or less.

According to an embodiment of the invention, an object-side third surface and a sensor-side fourth surface of the second lens have different radii of curvature on the optical axis, and a center of the first contact surface may be located closer to the object side than a center of the flange portion of the second lens. A diameter of the first lens may be smaller than a diameter of the second lens.

According to an embodiment of the invention, a material of the third lens and a material of the first lens are different, a refractive index of the third lens is lower than the refractive index of the first lens, and the third lens includes a flange portion extending toward an inner surface of the lens barrel from the optical axis, the flange portion of the third lens includes a second contact surface in contact with the lens barrel, the length of the second contact surface is 20% to 50% of a thickness of the flange portion of the third lens, and the object-side fifth surface and a sensor-side sixth surface of the third lens have different radii of curvature on the optical axis, the curvature radius of the object-side fifth surface of the third lens and the curvature radius of the sensor-side sixth surface of the third lens are 1.0 mm or more, and a center of the second contact surface may be located closer to a side having a greater radius of curvature among the object-side fifth surface of the third lens and the sensor-side sixth surface of the third lens based on the center of the thickness of the flange portion.

Advantageous Effects

According to an embodiment of the invention, it is possible to reduce thermal strain due to a material difference between lenses in a camera module or a shape change according to temperature.

According to an embodiment of the invention, it is possible to improve the reliability of the camera module by providing a camera module having at least one lens capable of mechanically thermal compensation.

According to an embodiment of the invention, thermal strain may be suppressed by adjusting the contact position and/or contact area with respect to the plastic lens, thereby improving the reliability of the camera module.

According to an embodiment of the invention, it is possible to suppress a change in optical characteristics due to expansion and contraction of the lens in a direction orthogonal to the optical axis in consideration of the contact characteristics between the flange portion of the lens and the inner surface of the lens barrel.

The embodiment of the invention suppresses a change in the shape of a lens that is optically sensitive to a thermal change, thereby suppressing a problem in which optical performance (MTF) is sharply deteriorated due to misalignment of optical axis of the lenses.

According to an embodiment of the invention, it is possible to improve the optical reliability of the camera module. In addition, it is possible to improve the reliability of the camera module and the vehicle camera device having the same.

DESCRIPTION OF DRAWINGS

FIG. 2 is a partial side cross-sectional view illustrating a combination of two lenses close to an object side and a lens barrel in the camera module of FIG. 1.

BEST MODE

Figure 1:
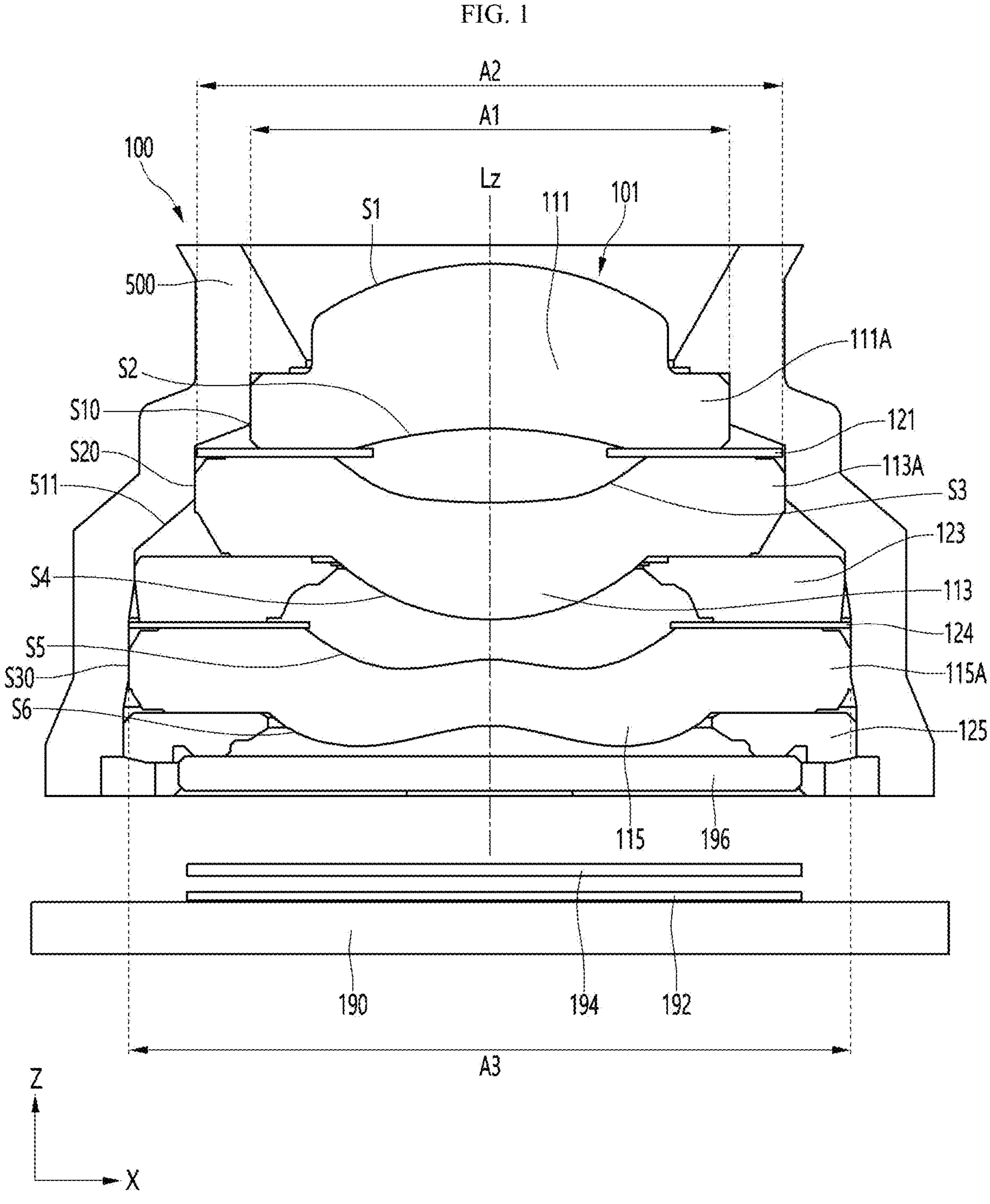
FIG. 1 is an example of a cross-sectional side view of a camera module according to an embodiment of the invention.

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology.

Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element. Several embodiments described below may be combined with each other, unless it is specifically stated that they cannot be combined with each other. In addition, the description of other embodiments may be applied to parts omitted from the description of any one of several embodiments unless otherwise specified.

In the description of the invention, the first lens means the lens closest to the object side among the plurality of lenses aligned with the optical axis, and the last lens means the lens closest to the sensor side among the plurality of lenses aligned with the optical axis. In the description of the invention, all measures for the radius, thickness/distance, TTL, etc. of the lens are mm unless otherwise specified. In the present specification, the shape of the lens is shown based on the optical axis of the lens. For example, the meaning that the object side of the lens is convex or concave means that the vicinity of the optical axis is convex or concave on the object side of the lens, but does not mean that the vicinity of the optical axis is convex or concave. Accordingly, even when it is described that the object side of the lens is convex, the portion around the optical axis on the object side of the lens may be concave, and vice versa. In the present specification, it should be noted that the thickness and radius of curvature of the lens are measured based on the optical axis of the lens. That is, the convex surface of the lens may mean that the lens surface of the region corresponding to the optical axis has a convex shape, and the concave lens surface means that the lens surface of the region corresponding to the optical axis may have a concave shape. In addition, "object-side surface" may mean a surface of the lens that faces the object side with respect to the optical axis, and "sensor-side surface" may mean a surface of the lens that faces the sensor-side surface with respect to the optical axis.

Figure 2:
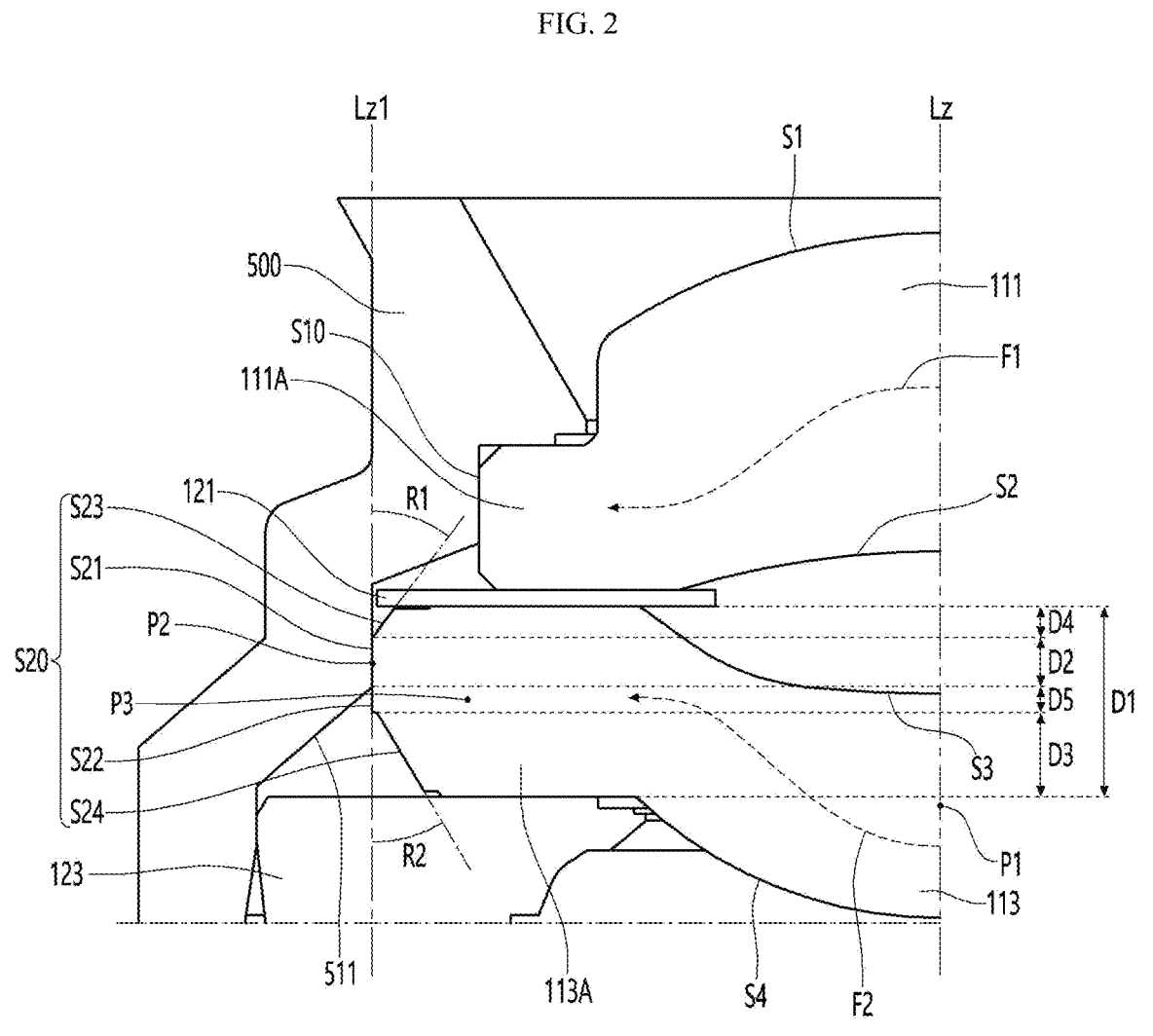
Figure 3:
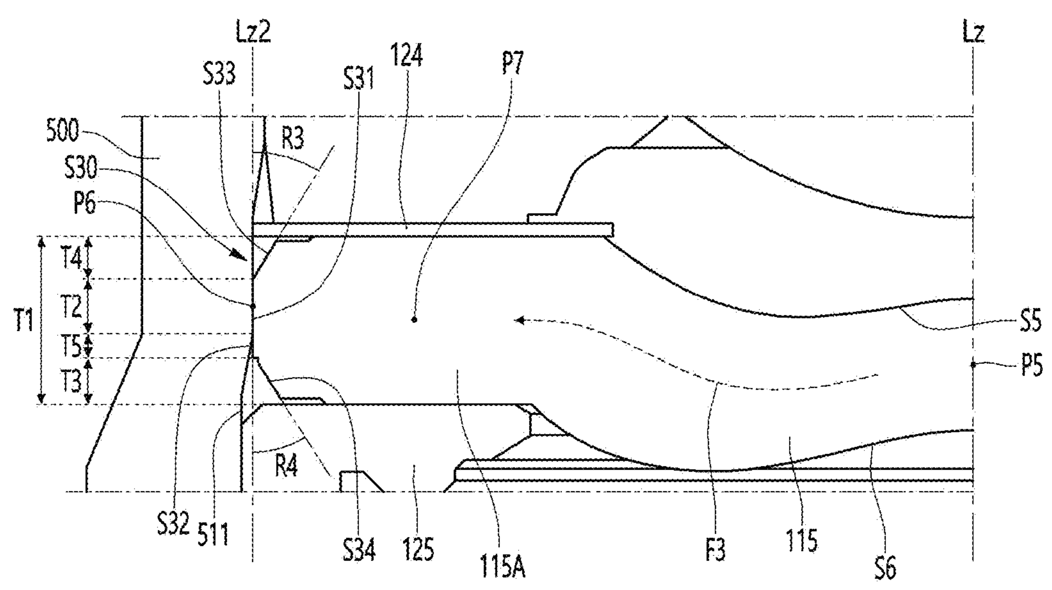
FIG. 3 is a partial side cross-sectional view illustrating the combination of the last lens close to the sensor side and the lens barrel in the camera module of FIG. 1.
Figure 4:
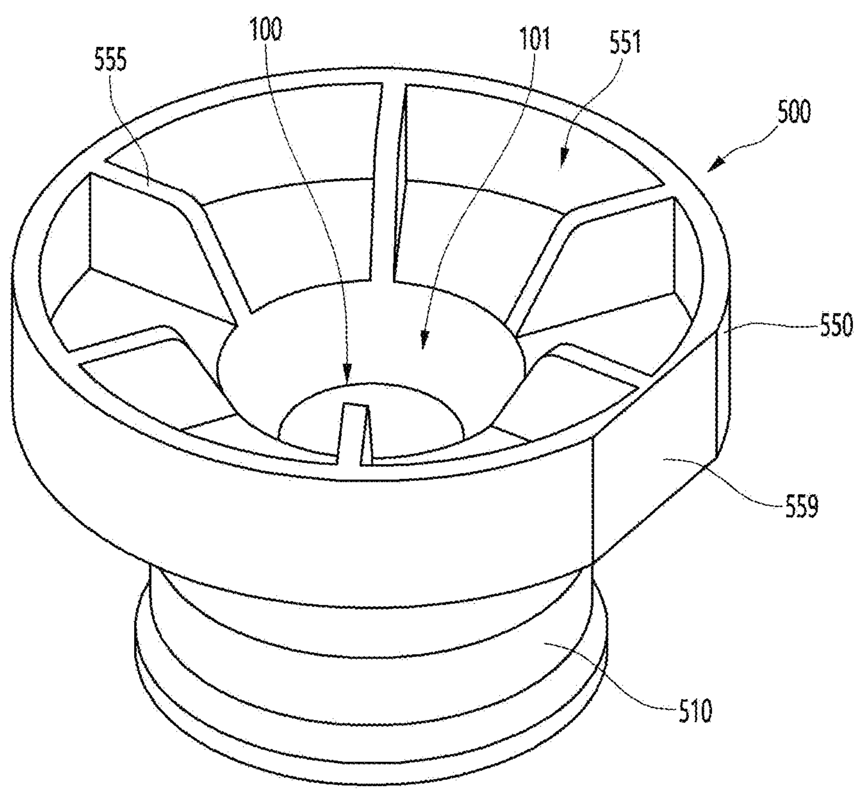
FIG. 4 is a perspective view of the camera module of FIG. 1.
Figure 6A:
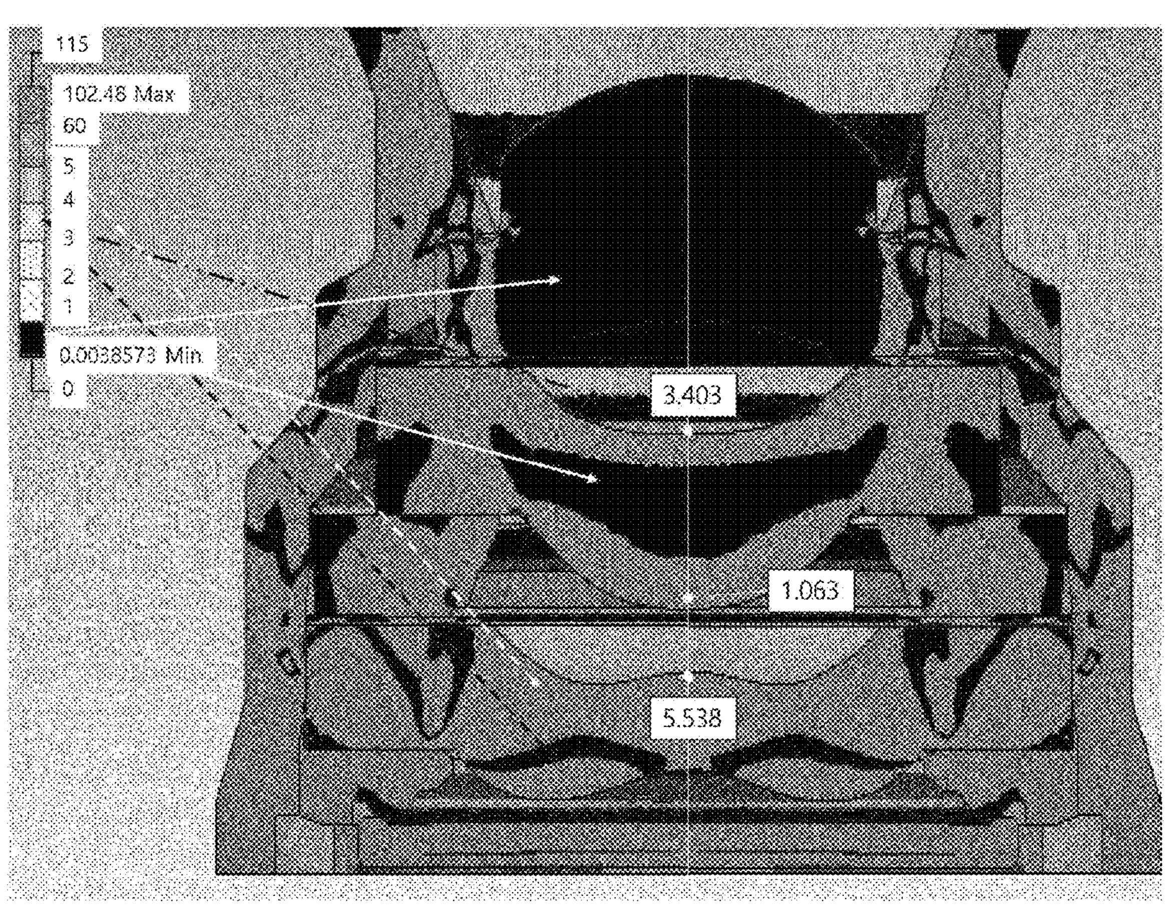
FIG. 6*a* is a diagram illustrating stress due to heat of a camera module of a comparative example.
Figure 6B:
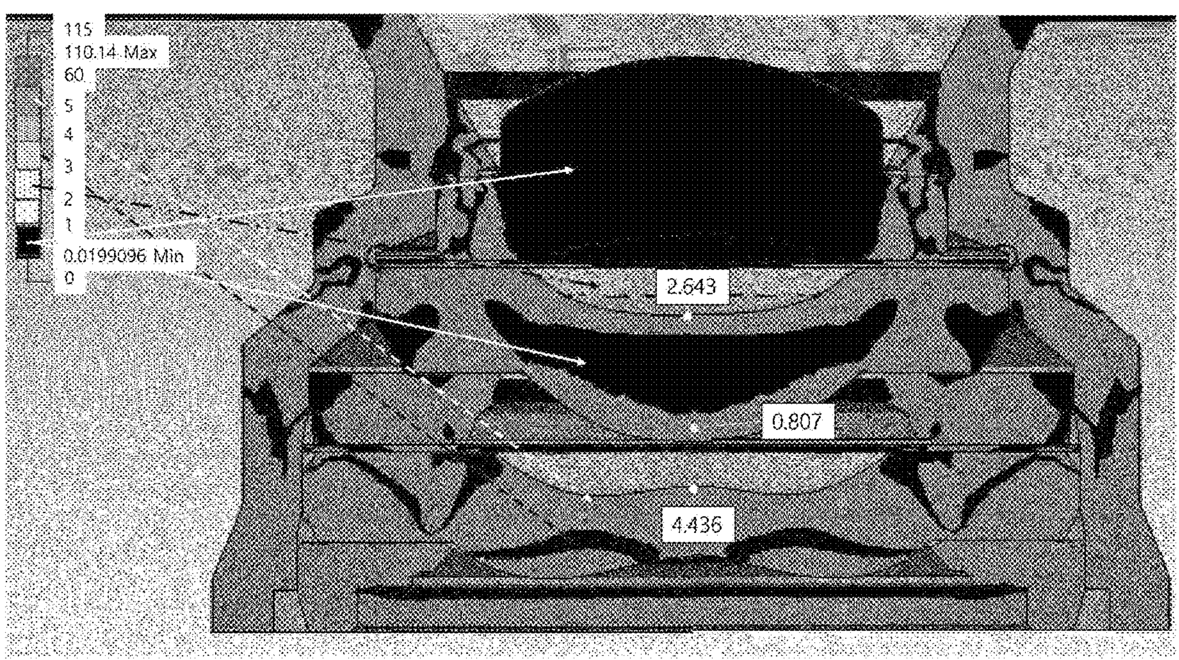
FIG. 6*b* is a view showing the stress due to heat of the camera module of the invention.
Figure 7A:
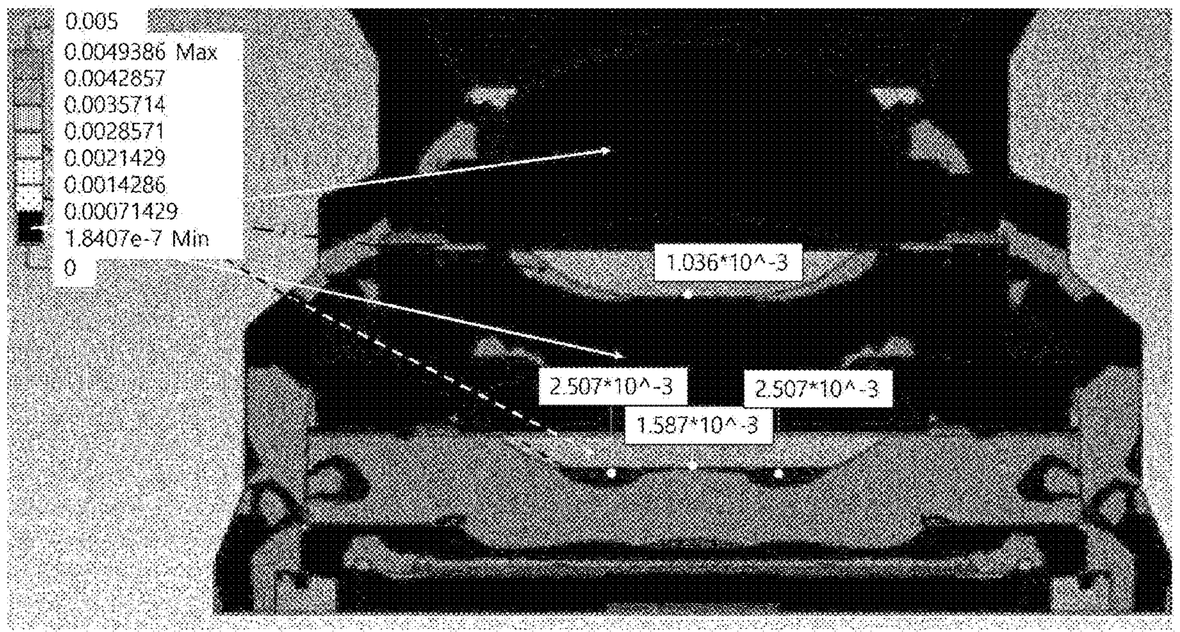
FIG. 7*a* is a view showing the strain ratio due to heat of the camera module of a comparative example.
Figure 7B:
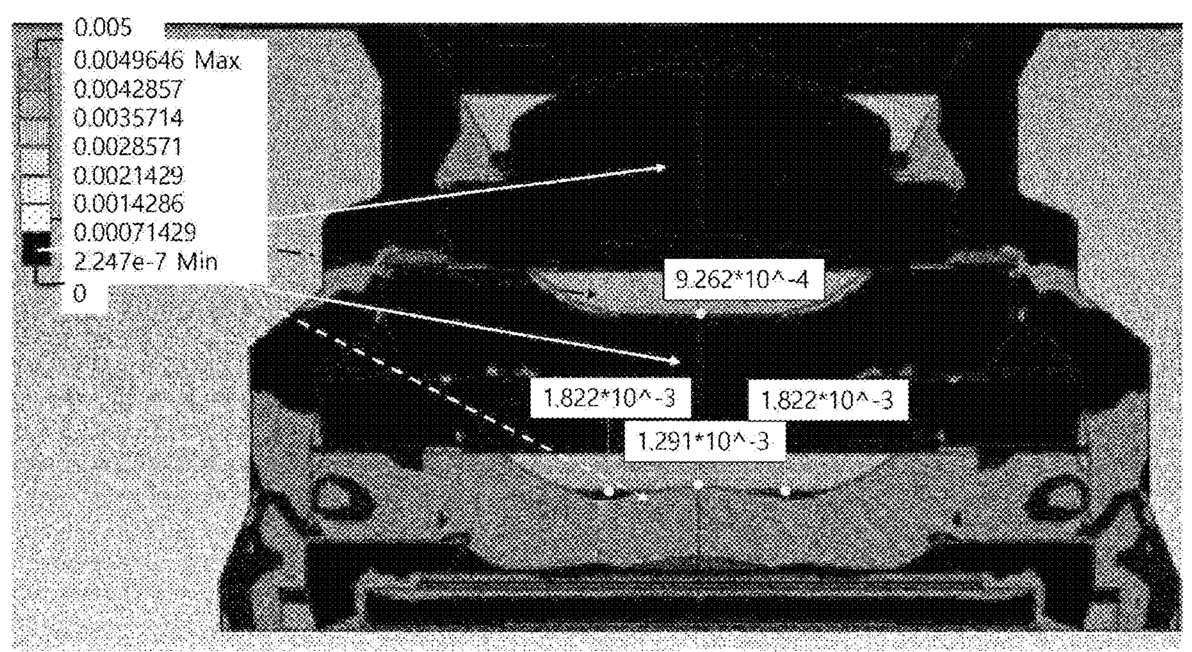
FIG. 7*b* is a view showing the strain ration due to heat of the camera module of the invention.
Figure 8A:
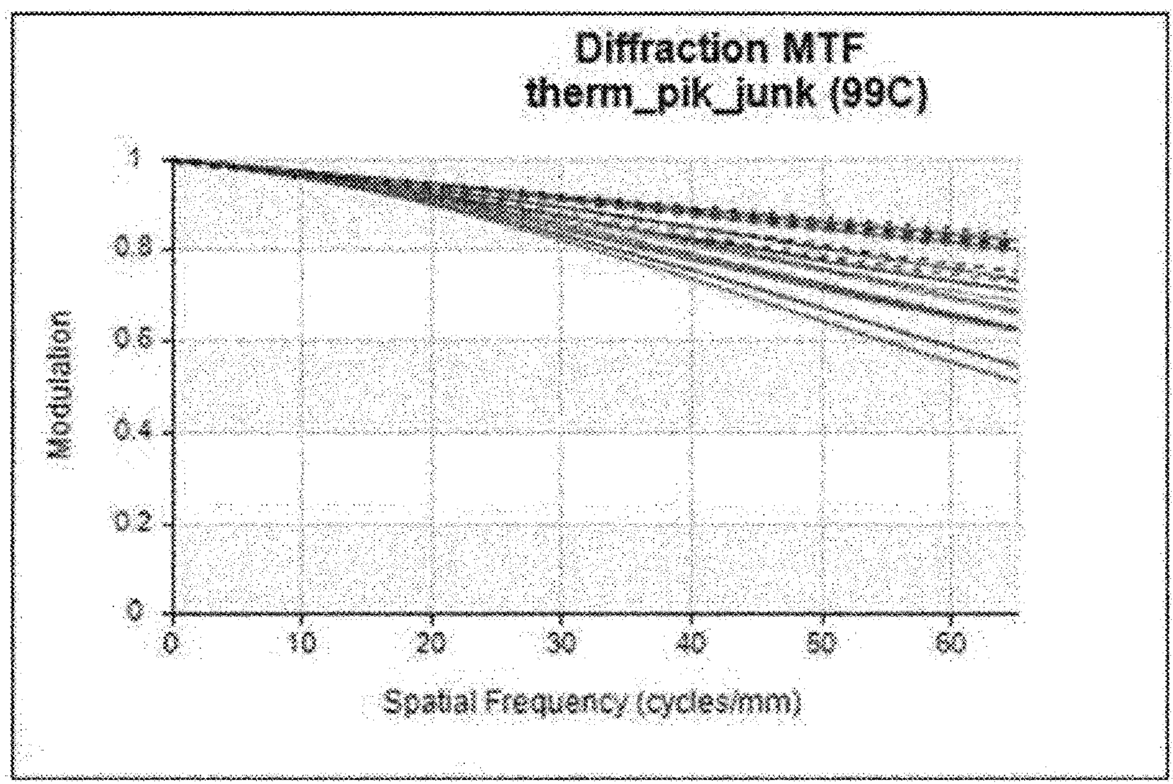
FIGS. 8*a* and 8*b* are graphs comparing the rate of change (MTF) of diffraction optical performance of the camera module of the comparative example and the invention.
Figure 8B:
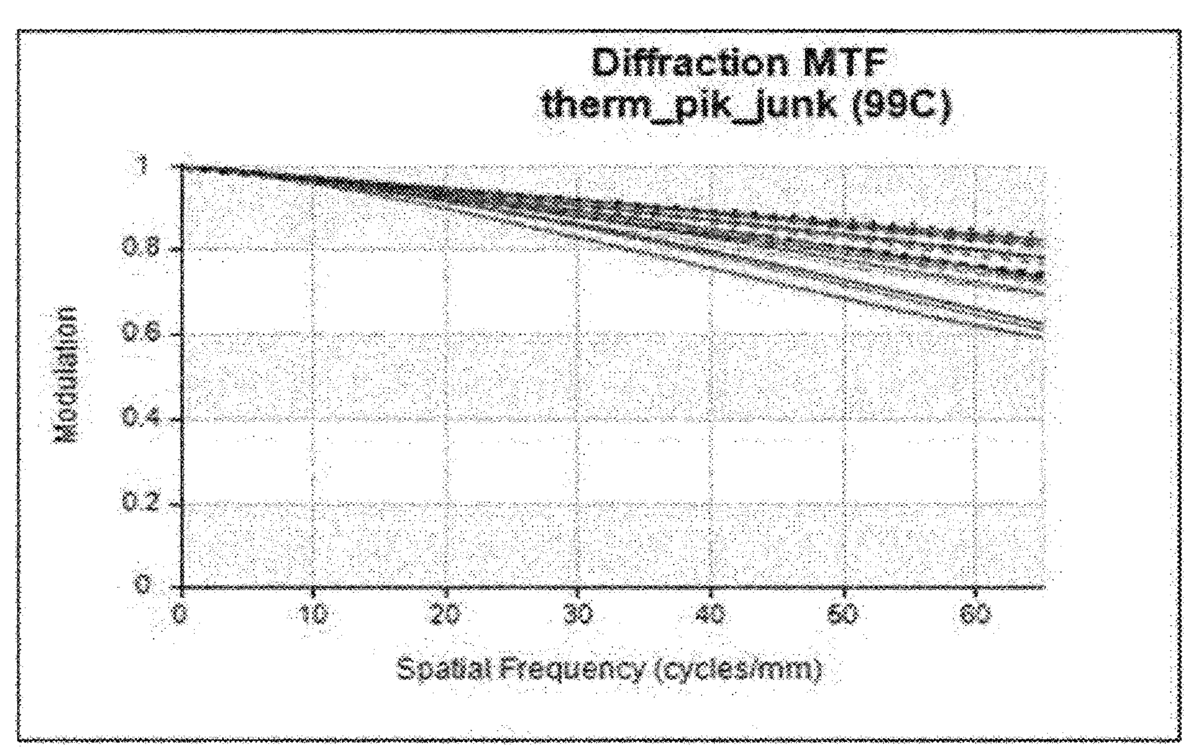
Figures 9A, 9B, 9C, 9D:
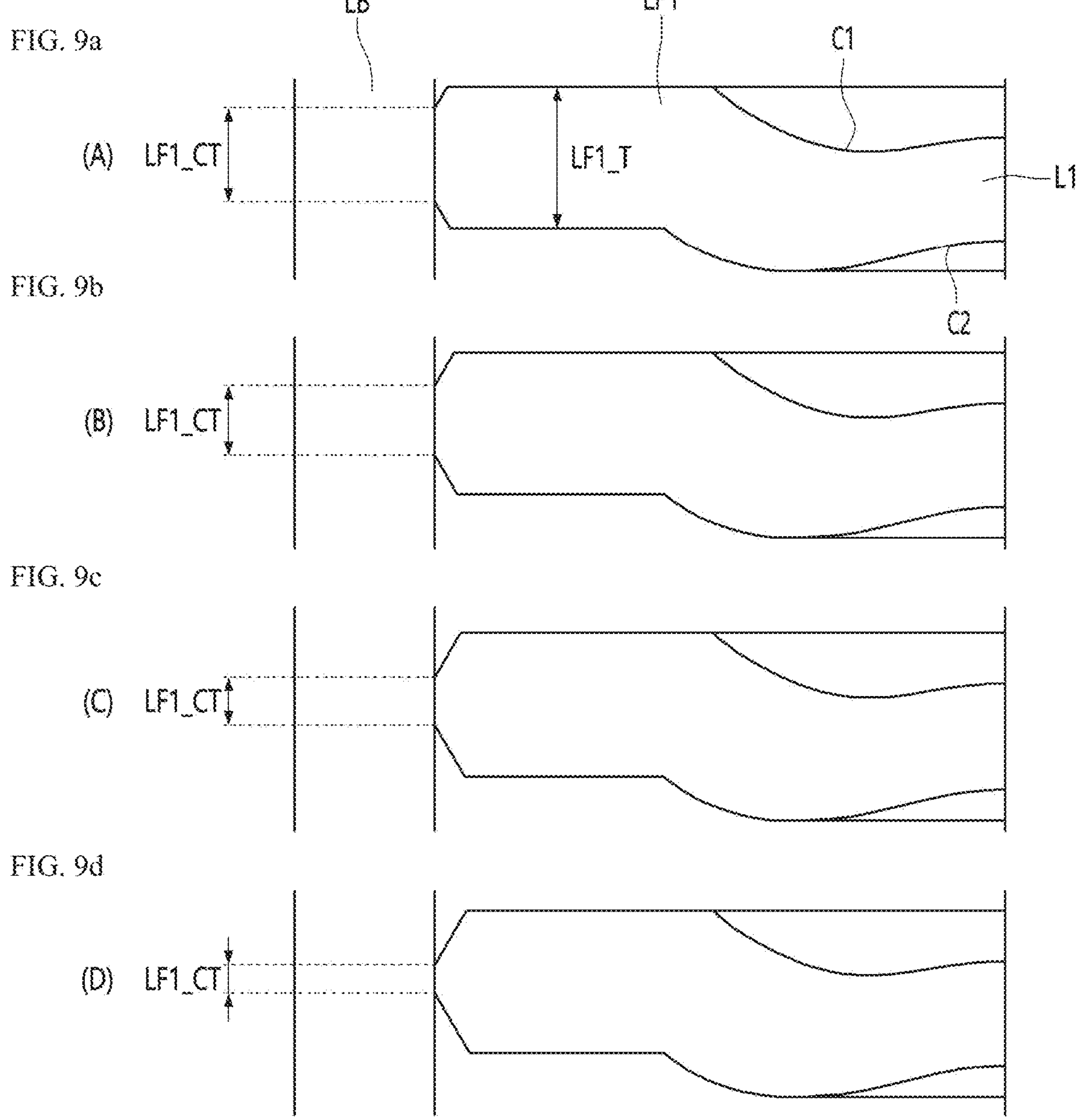
FIGS. 9*a*-9*d* are views comparing a contact ratio between a flange portion of a lens and a lens barrel in a camera module according to an embodiment of the invention.

FIG. 1 is an example of a side cross-sectional view of a camera module according to an embodiment of the invention, FIG. 2 is a partial side cross-sectional view showing a combination of two lenses close to the object side and a lens barrel in the camera module of FIG. 1, FIG. 3 is a partial side cross-sectional view showing the combination of the last lens close to the sensor side and the lens barrel in the camera module of FIG. 1, FIG. 4 is a perspective view of the camera module of FIG. 1, FIG. 6*a* is a view showing the thermal stress of the camera module of a comparative example, FIG. 6*b* is a diagram showing the thermal stress of the camera module according to an embodiment of the invention, FIGS. 7*a* and 7*b* are views showing the strain ratio due to heat of the camera module of a comparative example and the invention, and FIGS. 8*a* and 8*b* are graphs comparing the rate of change (MTF) of diffraction optical performance of the camera module of the comparative example and the invention.

Referring to FIGS. 1 to 5, a camera module 1000 according to an embodiment of the invention includes a lens barrel 500, a lens unit 100 having a plurality of lenses 111, 113, 115, spacing members 121, 123, 124, 125, and a main board 190 and an image sensor 192. The camera module 1000 may include an optical cover glass 194 and an optical filter 196 between the last lens of the lens unit 100 and the image sensor 192.

The lens unit 100 may be an optical system in which three or more lenses 111, 113, 115, and 117 are stacked. The lens unit 100 may include an optical system in which five or less lenses are stacked. The lens unit 100 may include three or more or five or less solid lenses. The lens unit 100 may include at least one plastic lens, or at least one glass lens and plastic lens. In the lens unit 100 according to an embodiment of the invention, there may be more lenses made of a plastic material than lenses made of a glass material, or two or more lenses. Here, the lens unit 100 may be laminated with plastic lenses and/or glass lens(s). Here, the coefficient of thermal expansion (CTE) of the plastic material is more than 5 times higher than the CTE of the glass material, and the change value $\|dN/dT\|$ of the refractive index as a function of temperature is 10 times higher than that of the glass material have. Here, dN is the change value of the refractive index of the lens, and dT is the change value of the temperature.

For convenience of explanation, the lens unit 100 includes the first lens 111, the second lens 113, and the third lens 115 may be arranged from the object side toward the image sensor 192 in the optical axis Lz.

The lenses 111, 113, and 115 of the lens unit 100 may be coupled to the through hole 501 in the lens barrel 500, for example, to be coupled in a direction from the sensor side to the object side, coupled in the opposite direction, or coupled in both directions. The lenses 111, 113, and 115 in the through hole 501 of the lens barrel 500 will be described as an example in which they are coupled in a direction from a sensor side to an object side.

Each of the lenses 111, 113, and 115 may include an effective region having an effective diameter through which light is incident and an ineffective region outside the effective region. The flange portions 111A, 113A, and 115A of the lenses 111, 113 and 115 may be ineffective regions. The ineffective region may be a region in which light is blocked by light blocking films 121 and 124. The flange portions 111A, 113A, and 115A may extend in a direction orthogonal to the optical axis Lz, a radial direction, or a circumferential direction in the effective region of the lenses 111, 113 and 115.

The first light blocking film 121 may be disposed on the outer periphery between the first lens 111 and the second lens 113, and at least one of the spacing member 123 and the second light blocking film 124 may be disposed around the outside between the second lens 113 and the third lens 115. The first and second light blocking films 121 and 124 may function as a member for blocking light in an ineffective region, and either one may be used as a diaphragm. The spacing member 123 may maintain a spacing between the second and third lenses 113 and 115. In the absence of the spacing member 123, the flange portions of the two lenses aligned in the optical axis direction may be in contact or may be in contact with each other by the light blocking film. At least one or all of the first light blocking film 121, the spacing member 123, and the second light blocking film 124 may function as a spacer. The thickness of the first and second light blocking films 121 and 124 may be thinner than the thickness of the spacing member 123. Here, an aperture stop may be disposed around the second surface S2 of the first lens 111 or may be used as the second surface S2.

A support member 125 may be disposed around the lower periphery of the third lens 115, and the support member 125 may support the third lens 115 or maintain a distance from the optical filter 196. Here, a portion of the outside S30 of the third lens 115 may be adhered to the inner surface 511 of the lens barrel 500 with an adhesive.

A diameter A1 of the first lens 111 may be smaller than a diameter A2 of the second lens 113, and the diameter A2 of the second lens 113 may be smaller than the diameter A3 of the third lens 115. The diameters A1, A2, and A3 of the first, second, and third lenses 111, 113, and 115 may gradually increase from the object side to the sensor side. The outer shape in which the first, second, and third lenses 111, 113, and 115 are stacked may be a pyramid shape or a polygonal shape. The first lens 111 is a lens closest to the subject, and at least one or both of the object-side first surface S1 on which light is incident and the sensor-side second surface S2 on which light is emitted may be spherical or aspherical. The first surface S1 of the first lens 111 may be convex, and the sensor-side second surface S2 may be concave. The first lens 111 may be made of glass.

The first lens 111 may include a first flange portion 111A on the outside. A portion of the outside S10 of the first flange portion 111A may be in contact with the inner surface 511 of the lens barrel 500. A length of a contact surface contacting the inner surface 511 of the lens barrel 500 among the outside of the first flange portion 111A may be 70% or more of a thickness of the first flange portion 111A. A length direction of the contact surface is parallel to or inclined at a predetermined angle to the optical axis Lz, or the first flange portion 111A is extended in a direction X orthogonal to the optical axis Lz outside the effective diameter of the first lens 111, and the thickness of the first flange portion 111A may be an interval between two surfaces in contact with the optical member among the object-side and sensor-side regions of the first flange portion 111A. The optical member may be an object in which a lens, a lens barrel, a spacing member, an aperture stop, a light blocking film, and the like are disposed inside the lens barrel. The length in contact with the inner surface 511 of the lens barrel 500 is the length from the object-side one end of the outer surface of the first flange portion 111A to the sensor-side other end.

The first lens 111 may be made of glass, and when the camera module 1000 is exposed to light from the inside or outside of the vehicle, it is possible to inhibit discoloration due to the plastic material, and to reduce the strain F1 due to heat. When the camera module 1000 is disposed in a vehicle, the first lens 111 may be made of glass or plastic material.

The first lens 111 may have a refractive index of 1.7 or more or 1.8 or more, or may be in a range of 1.7 to 2.3. When expressed as an absolute value, the radius of curvature of the first surface S1 of the first lens 111 may be smaller than the radius of curvature of the second surface S2, for example, may be 3.3 mm or less. The difference between the radius of curvature of the first surface S1 of the first lens 111 and the radius of curvature of the second surface S2 of the first lens 111 may be 1 mm or more, for example, may be in the range of 1 mm to 3 mm. The center thickness of the first lens 111 may be the thickest among the lenses of the lens unit 100, and may be, for example, 1 mm or more. When looking at the size of the effective diameter of the first lens 111, the effective diameter of the first surface S1 may be larger than the effective diameter of the second surface S2.

The second lens 113 and the third lens 115 may have different materials and refractive indexes from those of the first lens 111. The second lens 113 may be made of a plastic material. The second lens 113 may be disposed between the first lens 111 and the third lens 115 and may have the second flange portion 113A on the outside. The third lens 115 may be made of a plastic material. The third lens 115 is disposed between the second lens 113 and the optical filter 196 and may have the third flange portion 115A on the outside. The second lens 113 and the third lens 115 may be injection molded from a plastic material.

Referring to FIGS. 1 and 2, the second lens 113 includes an object-side third surface S3 and a sensor-side fourth surface S4, and the third surface S3 and the fourth surface S4 may be aspherical. The third surface S3 and the fourth surface S4 of the third lens 113 may have different radii of curvature expressed in absolute values. The third surface S3 may be concave, and the sensor-side fourth surface S4 may be convex. As another example, the second lens 113 has two surfaces with different radii of curvature expressed in absolute values, for example, the third surface S3 is convex and the fourth surface S4 is concave. The third surface S3 is convex and the fourth surface S4 is convex, or the third surface S3 is concave and the fourth surface S4 is concave.

The second lens 113 may include the second flange portion 113A on the outside. A portion of the outside S20 of the second flange portion 113A may be in contact with the inner surface 511 of the lens barrel 500. The second flange portion 113A extends from the outside of the effective diameter of the second lens 113 in a direction X orthogonal to the optical axis Lz, and the thickness D1 may be an interval between two surfaces in contact with the optical member among the object-side and sensor-side regions of the second flange portion 113A. The optical member may be an object disposed inside the lens barrel, such as a lens, a lens barrel, a spacing member, an aperture stop, and a light blocking film. The thickness D1 of the second flange portion 113A of the second lens 113 is a distance between a surface in contact with the first spacing member 121 and a surface in contact with the second spacing member 123 on the second flange portion 113A, for example, the distance may be a distance in a direction parallel to the optical axis.

As shown in FIG. 2, the outside S20 of the second flange portion 113A may include a first contact surface S21 in contact with the inner surface 511 of the lens barrel 500, a first inclined surface S23 between the first contact surface S21 and the object-side surface, and a second inclined surface S24 between the first contact surface S21 and the sensor-side surface. The outside S20 of the second flange portion 113A extends from the first contact surface S21 in an axial direction parallel to the optical axis Lz, and may include a first non-contact surface S22 disposed between the first contact surface S21 and the second inclined surface S24. The first contact surface S21 may be disposed on the outermost side of the second flange portion 113A and may be in contact with the inner surface 511 of the lens barrel 500. The first non-contact surface S22 may extend vertically or in the same plane from a lower end of the first contact surface S21, and may not contact the inner surface 511 of the lens barrel 500. A contact length D2 of the first contact surface S21 may be smaller than the thickness D1 of the second flange portion 113A. The contact length D2 of the first contact surface S21 may be 50% or less of the thickness D1 or may be in a range of 20% to 50% of the thickness D1. The direction Lz1 of the contact length D2 may be an axial direction parallel to the optical axis Lz or may be inclined at a predetermined angle with respect to the axis Lz1 parallel to the optical axis Lz.

The distance between the first non-contact surface S22 and the inner surface 511 may increase toward the sensor side. A vertical length D5 of the first non-contact surface S22 may be smaller than the contact length D2 of the first contact surface S21. When the second lens 113 is injection-molded, the first non-contact surface S22 is extended from the lower end of the first contact surface S21 toward the sensor side, and is spaced from the inner surface 511 of the lens barrel 500, even if a structure such as a burr is generated on the first non-contact surface S22, the length D3 of the first non-contact surface S22 may be a distance at which the first contact surface S21 and the inner surface 511 of the lens barrel 500 may be in close contact with each other without interfering with the surface contact of the first contact surface S21. Alternatively, the first non-contact surface S22 may inhibit assembly failure of the second lens 113 due to a burr. The length DS of the first non-contact surface S22 may be 1/15 or less or 1/20 or less of the thickness D1 of the second flange portion 113A. The thickness D1 of the second flange portion 113A may be 0.7 mm or more, for example, in a range of 0.7 mm to 1.2 mm.

The first inclined surface S23 of the second flange portion 113A may be extended to a first angle R1 from the object-side end of the first contact surface S21 toward the object-side surface of the second flange portion 113A. The first angle R1 may be 40 degrees or less with respect to the axis Lz1 parallel to the optical axis, for example, in the range of 10 degrees to 40 degrees or in the range of 15 degrees to 35 degrees. When the first angle R1 is smaller than the above range, there is difficulty in injection molding, and when the first angle R1 is larger than the above range, the fixing force of the second flange portion 113A of the second lens 113 may decrease or the second flange portion 113A may be distorted. The second inclined surface S24 may extend from one end of the sensor side of the first non-contact surface S22 toward the sensor-side surface of the second flange portion 113A at a second angle R2. The second angle R2 may be 40 degrees or less with respect to the axis Lz1 parallel to the optical axis, for example, in the range of 10 degrees to 40 degrees, or in the range of 15 degrees to 35 degrees. The second angle R2 may be equal to or smaller than the first angle R1. When the second angle R2 is smaller than the above range, there is difficulty in injection molding, and when the second angle R2 is larger than the above range, the fixing force of the second flange portion 113A of the second lens 113 may decrease or the second flange portion 113A may be distorted.

The refractive index of the second lens 113 may be lower than that of the first lens 111, and may be less than 1.7, for example, in the range of 1.45 to 1.69. A difference in refractive index between the second lens 113 and the first lens 111 may be 0.3 or more. When expressed as an absolute value, the radius of curvature of the third concave surface S3 of the second lens 113 may be greater than the radius of curvature of the convex fourth surface S4, for example, 7 mm or more or in the range of 5.1 mm to 7 mm. The radius of curvature of the fourth surface S4 may be 5 mm or less in absolute value, for example, may be in the range of 2 mm to 5 mm. The difference between the radius of curvature of the third surface S3 of the second lens 113 and the radius of curvature of the fourth surface S4 may be 1 mm or more, for example, in the range of 1 mm to 5 mm.

The center thickness of the second lens 113 may be the second thickest among the lenses of the lens unit 100, for example, thinner than the center thickness of the first lens 111, and thicker than the center thickness of the third lens 113. A center interval between the second lens 113 and the first lens 111 may be smaller than a thickness of the first lens 111 and may be larger than a center interval between the second and third lenses 113 and 115. In the size of the effective diameter of the second lens 113, the effective diameter of the third surface S3 may be smaller than the effective diameter of the fourth surface S4. The effective diameter of the third surface S4 may be greater than the effective diameter of the second surface S2, and may be smaller than the effective diameter of the first surface S1.

The second lens 113 is made of a plastic material, and has a higher coefficient of thermal expansion than that of a glass material, so that strain F2 due to heat may be greater. In an embodiment of the invention, when the radii of curvature of the third surface S3 and the fourth surface S4 of the second lens 113 are different, a relief structure may be provided on the outside S20 of the second flange portion 113A so that the thermal strain F2 due to the difference between the radii of curvature of the two surfaces S3 and S4 and the plastic material is minimized. The relief structure may optimize the area or the vertical length of the first contact surface S21 of the outside S20 of the second flange portion 113A based on the thermal strain F2 due to the difference between the radii of curvature of the third and fourth surfaces S3 and S4 on the optical axis of the second lens 113.

In the second lens 113, when the radius of curvature of the third surface S3 is greater than the radius of curvature of the fourth surface S4 by one or more as absolute values on the optical axis, a center P1 on the optical axis between the third surface S3 and the fourth surface S4 may be located closer to the sensor side than the vertical center P3 of the second flange portion 113A. In addition, the center P2 of the length D2 of the first contact surface S21 is located closer to the object side than the center P1 on the optical axis of the second lens 113, and may be located closer to the object side than the vertical center P3 of the second flange portion 113A. Since the center P2 of the first contact surface S21 is located closer to the object side than the vertical center P3 of the second flange portion 113A, the first contact surface S21 is more in contact with the inner surface 511 of the lens barrel 500 than the outer lower portion on the outer upper portion of the second flange portion 113A, and may alleviate the thermal strain F2 due to the difference between the radii of the curvature of the third and fourth contact surfaces S3 and S4 of the second lens 113 and the plastic material. For example, the upper portion may mean the object side, and the lower portion may mean the sensor side. For example, as the radius of curvature of the lens decreases, the optical performance change according to the temperature change may be greater. When the radii of curvature differ by 1 or more, a lens having a small radius of curvature may be more sensitive to temperature change and may be a lens having a larger optical performance change according to temperature change. By disposing the center P2 of the first contact surface S21 away from the surface having a small radius of curvature, deterioration in optical performance due to temperature change may be alleviated.

The length D2 of the first contact surface S21 of the second flange portion 113A may be formed in a range of 20% to 50% of the thickness D1 of the second flange portion 113A. Since the first contact surface S21 is in surface contact with the inner surface 511 of the lens barrel 500 from the outer upper portion of the second flange portion 113A, and the thermal strain F2 transferred to the outer lower portion of the second flange portion 113A may relieve. When the length D2 of the first contact surface S21 is smaller than the above range, the position of the second lens may be deformed as the temperature changes, when it is larger than the above range, the relaxation of the thermal strain F2 of the second lens 113 may be insignificant, there is a difficulty in injection molding, and the thermal stress on the optical axis Lz may be increased and the thermal strain ratio may be increased. The vertical length (D2+D5) of the outside S20 of the second flange portion 113A may be formed in a range of 20% to 50% of the thickness D1 of the second flange portion 113A.

The vertical length (D2+D5) of the outside S20 of the second flange portion 113A may be greater than a length D4 between two horizontal straight lines passing both ends of the first inclined surface S23 of the second flange portion 113A and may be smaller than the length D3 between two horizontal straight lines passing both ends of the second inclined surface S24 of the second flange portion 113A. The length D3 of the first inclined surface S23 may be smaller than the length D4 of the second inclined surface S24, so that the first contact surface S21 has a contact area or contact length D2 and may be provided to be moved closer to the object side or to be moved closer to the object side.

Referring to FIGS. 1 and 3, the third lens 115 is made of plastic material and includes a fifth surface S5 on the object side and a sixth surface S6 on the sensor side, and the fifth surface S5 and the sixth surface S6 may be an aspherical surface. The fifth surface S5 may be convex on the optical axis Lz, and the sixth surface S6 may be concave on the optical axis Lz. As another example, the third lens 115 has two surfaces with different radii of curvature expressed in absolute values, for example, the fifth surface S5 is convex and the sixth surface S6 is concave. The fifth surface S5 is convex and the sixth surface S6 is convex, or the fifth surface S5 is concave and the sixth surface S6 is concave.

The third lens 115 may include a third flange portion 115A on the outside. A portion of the outside S30 of the third flange portion 115A may be in contact with the inner surface 511 of the lens barrel 500. The third flange portion 115A extends from the outside of the effective diameter of the third lens 115 in a direction X orthogonal to the optical axis Lz, and a thickness T1 of third flange portion 115A may be an interval between two surfaces in contact with the optical member among the object-side and the sensor-side regions of the third flange portion 115A. The optical member may be an object disposed inside the lens barrel, such as a lens, a lens barrel, a spacing member, an aperture stop, and a light blocking film. The thickness TI of the third flange portion 115A of the third lens 115 is a distance between a surface of the third flange portion 115A in contact with the second light blocking film 124 and a surface of the third flange portion 115A in contact with the support member 125, for example, the distance may be a distance in a direction parallel to the optical axis.

As shown in FIG. 3, the outside S30 of the third flange portion 115A may include a second contact surface S31 that is in contact with the inner surface 511 of the lens barrel 500, a third inclined surface S33 between the second contact surface S31 and the object-side surface, and a fourth inclined surface S34 between the first contact surface S31 and the sensor-side surface The outside S30 of the third flange portion 115A extends from the second contact surface S31 in an axial direction parallel to the optical axis Lz, and may include a second non-contact surface S32 disposed between the second contact surface S31 and the fourth inclined surface S34. The second contact surface S31 may be disposed on the outermost side of the third flange portion 115A and may be in contact with the inner surface 511 of the lens barrel 500. The second non-contact surface S32 may extend vertically or in the same plane from the lower end of the second contact surface S31, and may not contact the inner surface 511 of the lens barrel 500. A contact length T2 of the second contact surface S31 may be smaller than a thickness T1 of the third flange portion 115A. The contact length T2 of the second contact surface S31 may be 60% or less, in a range of 20% to 50%, or in a range of 30% to 60% of the thickness T1. A direction Lz2 of the contact length T2 may be an axial direction parallel to the optical axis Lz or may be inclined at a predetermined angle with respect to an axis Lz2 parallel to the optical axis Lz. The second non-contact surface S32 may have a greater distance from the inner surface 511 toward the sensor. A vertical length T5 of the second non-contact surface S32 may be smaller than a contact length T2 of the second contact surface S31. The second non-contact surface S32 is extended from the lower end of the second contact surface S31 toward the sensor when the third lens 115 is injection-molded, and since the second non-contact surface S32 is spaced apart from the inner surface 511 of the lens barrel 500, even if a structure such as a burr is generated on the second non-contact surface S32, the length T3 of the second non-contact surface S32 may be a distance at which the second contact surface S31 and the inner surface 511 of the lens barrel 500 may be in close contact with each other without interfering with the surface contact of the second contact surface S31. Alternatively, the second non-contact surface S32 may inhibit assembly failure of the third lens 115 due to a burr. The length T5 of the second non-contact surface S32 may be 1/15 or less or 1/20 or less of the thickness T1 of the third flange portion 115A. The thickness T1 of the third flange portion 115A is smaller than the thickness D1, and may be 0.6 mm or more, for example, in the range of 0.6 mm to 1 mm.

The third inclined surface S33 of the third flange portion 115A may be extended at a third angle R3 from the object-side end of the second contact surface S31 toward the object-side surface of the second flange portion 115A. The third angle R3 may be 40 degrees or less with respect to the axis Lz2 parallel to the optical axis, for example, in the range of 10 degrees to 40 degrees, or in the range of 15 degrees to 35 degrees. When the third angle R3 is smaller than the above range, there is a difficulty in injection molding, and when the third angle R3 is larger than the above range, the fixing force of the third flange portion 11SA of the third lens 115 may be decrease or the third flange portion 115A may be distorted. The fourth inclined surface S34 may extend from one end of the sensor-side of the second non-contact surface S32 toward the sensor-side surface of the third flange portion 115A at a fourth angle R4. The fourth angle R4 may be 40 degrees or less with respect to the axis Lz2 parallel to the optical axis, for example, in the range of 10 degrees to 40 degrees or in the range of 15 degrees to 35 degrees. The fourth angle R4 may be equal to or greater than the third angle R3. When the fourth angle R4 is smaller than the above range, there is difficulty in injection molding, and when the fourth angle R4 is larger than the above range, the fixing force of the third flange portion 115A of the third lens 115 may be decrease or the third flange portion 115A may be distorted.

The refractive index of the third lens 115 may be lower than that of the first lens 111, and may be less than 1.7, for example, in the range of 1.45 to 1.69. The materials of the second and third lenses 113 and 115 may be the same, and may have the same refractive index. A difference in refractive index between the third lens 115 and the first lens 111 may be 0.3 or more. When expressed as an absolute value, the radius of curvature of the convex fifth surface S5 of the third lens 115 may be greater than the radius of curvature of the concave sixth surface S6, for example, 3 mm or more or 3 mm to 6.5 mm. The radius of curvature of the sixth surface S6 may be an absolute value of 4 mm or less, for example, in a range of 1.5 mm to 4 mm. The difference between the radius of curvature of the fifth surface S5 of the third lens 115 and the radius of curvature of the sixth surface S6 may be 1 mm or more, for example, in the range of 1 mm to 5 mm or in the range of 2 mm to 5 mm.

A center thickness of the third lens 115 may be thinner than the center thickness of the first lens 111, and may be thinner than the center thickness of the second lens 113. A center interval between the third lens 115 and the second lens 113 may be greater than the center interval between the first and second lenses 111 and 113. The center interval between the third lens 115 and the optical filter 196 may be smaller than the center interval between the second and third lenses 113 and 115. In the size of the effective diameter of the third lens 115, the effective diameter of the fifth surface S5 may be smaller than the effective diameter of the sixth surface S6. The effective diameter of the sixth surface S6 may be larger than the effective diameter of the third surface S3, and may be larger than the effective diameter of the first surface S1.

The third lens 115 is made of a plastic material, and has a higher coefficient of thermal expansion than that of a glass material, so that thermal strain F3 due to heat may be greater. In an embodiment of the invention, when the radii of curvature of the fifth surface SS and the sixth surface S6 of the third lens 115 are different, a relief structure may be provided on the outside S30 of the third flange portion 115A so that the thermal strain F3 due to the difference between the radii of curvature of the two surfaces S5 and S6 and the plastic material is minimized. The relief structure may optimize the area or the vertical length of the second contact surface S31 of the outside S30 of the third flange portion 115A based on the thermal strain F3 due to the difference in curvature radii of the fifth and sixth surfaces S5 and So on the optical axis of the third lens 115. In the third lens 115, when the radius of the curvature of the fifth surface S5 is greater than the radius of the curvature of the sixth surface S6 by one or more as absolute values on the optical axis Lz, a center P5 on the optical axis between the surfaces S4 may be located closer to the sensor side than the vertical center P6 of the third flange portion 115A. In addition, the center P6 of the length T2 of the second contact surface S31 is located closer to the object side than center P5 on the optical axis of the third lens 115, and may be located closer to the object side than the vertical center P7 of the third flange portion 115A.

Since the center P6 of the second contact surface S31 is located closer to the object side than the vertical center P7 of the third flange portion 115A, the second contact surface S31 is more in contact with the inner surface 511 of the lens barrel 500 than the outer lower portion on the outer upper portion of the third flange portion 115A, and may alleviate the thermal strain F3 due to the difference in curvature radii between the fifth and sixth surfaces S6 and S6 of the third lens 115 and the plastic material. For example, the upper portion may mean the object side, and the lower portion may mean the sensor side. For example, As the radius of curvature of the lens decreases, the optical performance change according to the temperature change may be greater. When the radii of curvature differ by 1 or more, a lens having a small radius of curvature may be more sensitive to temperature change and may be a lens having a larger optical performance change according to temperature change. By disposing the center P6 of the second contact surface S31 away from a surface having a small radius of curvature, deterioration in optical performance due to temperature change may be alleviated.

The length T2 of the second contact surface S31 of the third flange portion 115A is 60% or less of the thickness T1 of the third flange portion 115A, and may be in the range of 20% to 50% or in the range of 30% to 60% of the thickness T1 of the third flange portion 115A. Since the second contact surface S31 is in surface contact with the inner surface 511 of the lens barrel 500 at the outer upper portion of the third flange portion 115A, the thermal strain F3 transferred to the outer upper portion of the third flange portion 115A may relieve. When the length T2 of the second contact surface S31 is smaller than the above range, the relaxation of the thermal strain F3 of the third lens 115 may be insignificant, when it is larger than the above range, there is a difficulty in injection molding, and the thermal stress on the optical axis Lz may be increased and the thermal strain ratio may be increased. The vertical length (T2+T5) of the outside S30 of the third flange portion 115A is 60% or less of the thickness T1 of the third flange portion 115A, and may be formed in a range of 20% to 50% or 30% to 60%.

The vertical length (T2+T5) of the outside S30 of the third flange portion 115A may be greater than a length T4 between two horizontal straight lines passing both ends of the third inclined surface S33 of the third flange portion 113A, and may be smaller than the length T3 between two horizontal straight lines passing both ends of the fourth inclined surface S34 of the third flange portion 113A. The lengths T3 and T4 may be equal to each other. As another example, in the second and third lenses 113 and 115, the difference between the radii of curvature of the third and fourth surfaces S3 and S4 or the radii of curvature of the fifth and sixth surfaces S5 and S6 as absolute value on the optical axis Lz is less than 1, the centers P2 and P6 of the first and second contact surfaces S21 and S31 may be located closer to the centers P3 and P7 of the flange portions 111A, 113A, and 115A.

Figure 5:
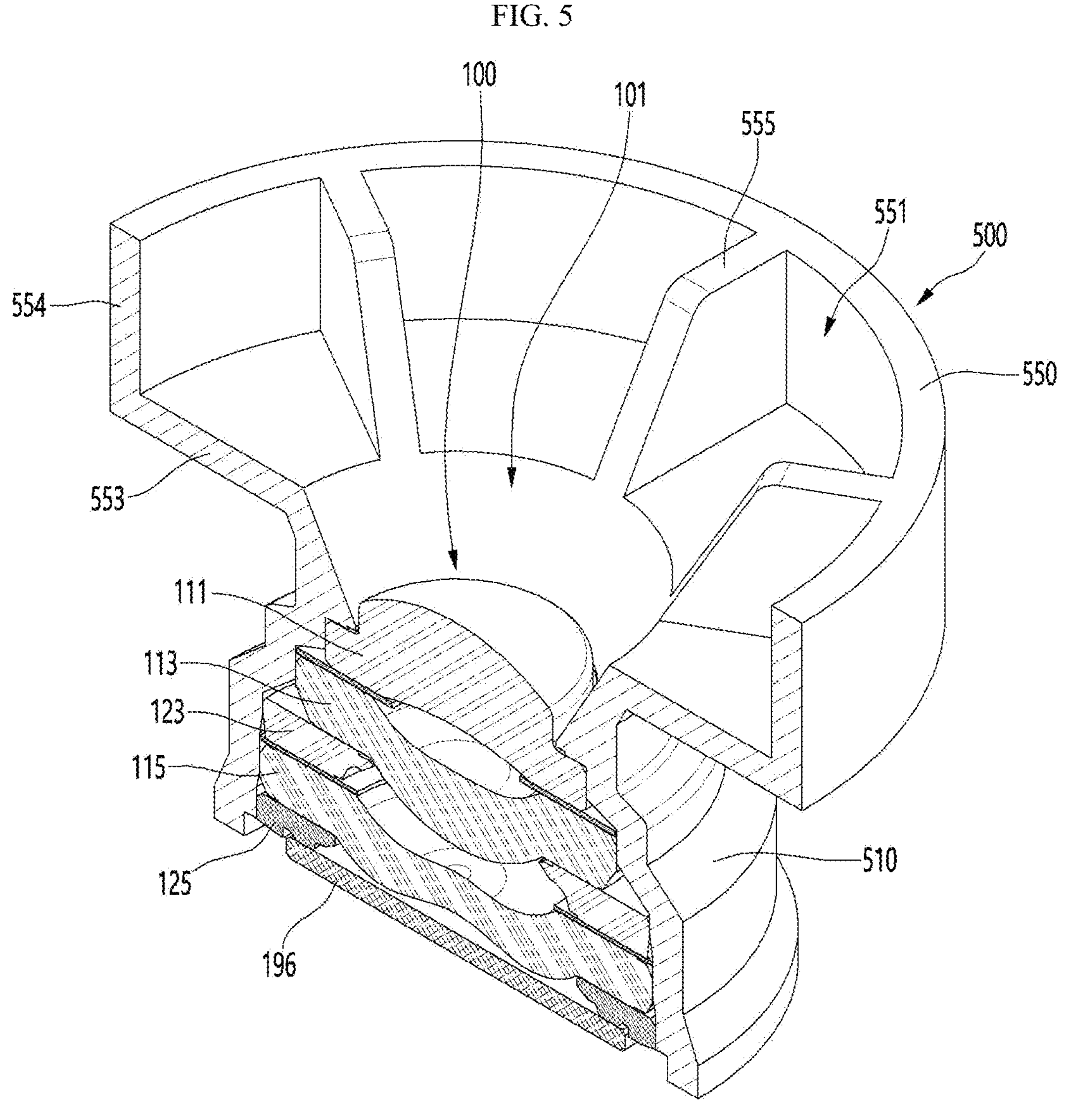
FIG. 5 is a perspective view illustrating a partial side cross-section of the camera module of FIG. 4.

As shown in FIGS. 4 and 5, the lens barrel 500 may include an upper barrel portion 550 and a lower barrel portion 510. The upper barrel portion 550 and the lower barrel portion 510 may be integrally formed. The outer diameter or maximum diameter of the upper barrel portion 550 may be greater than the outer diameter or maximum diameter of the lower barrel portion 510. The upper barrel portion 550 has an open region 551 larger than the diameter of the opening 101 therein, the top of the open region 551 is open, and a plurality of ribs 555 may extend in the direction of the outer circumferential surface from the center of the optical axis. A diameter of the open region 551 may be greater than a diameter of the opening 101. The upper barrel portion 550 includes a bottom part 553 and a side wall part 554, and the ribs 555 may be connected to the bottom part 553 and the side wall part 554. The lower barrel portion 510 may extend along the outer peripheral surface of the opening 101 through the bottom part 553. By providing the lower barrel portion 510 of the lens barrel 550 in a structure or shape having different outer diameters, even if thermal strain is generated by the inner lenses 111, 113, and 115, it may be effectively suppressed.

Three or more of the plurality of ribs 555 may be spaced apart from each other and support the upper barrel portion 550. The plurality of ribs 555 may be arranged in a radial direction from the optical axis. Each of the plurality of ribs 555 protrude from the bottom portion 553 of the open region 551 in the optical axis direction, and may have the same height and thickness. The thickness of the rib 555 may be the width in the circumferential direction. Each of the ribs 555 may have different lengths extending outward from the optical axis. For example, the upper length of each rib 555 may be greater than the lower length. The lower length may extend from the outside of the upper end of the opening 101 to the side wall portion 555 of the upper barrel 550 that is the outer cover of the open region 551, and the upper length may be disposed on the same plane as the upper surface of the upper barrel 550 and may extend in the optical axis direction. A circumferential surface of the opening 101 may be inclined, and an outer surface of the upper barrel portion 550 may extend vertically.

The upper barrel portion 550 may be coupled to another transfer device, and a decrease in rigidity may be inhibited by the rib 555. One surface of the upper barrel portion 550 is provided with a flat surface 559, which may be fixed in position or used as a bottom surface. The lower barrel portion 510 has at least two or three or more lenses described above therein, and may include, for example, first to third lenses 111, 113, and 115. The lower barrel portion 510 may have a first outer diameter outside the first lens 111, a second outer diameter outside the second lens 113, and a support body having a third outer diameter outside the third lens 115. The sizes of the outer diameters may have a following relationship: first outer diameter<second outer diameter<third outer diameter. The lower barrel portion 510 may have a predetermined thickness on the outside of each lens 111, 113, and 115, and the thickness is a linear distance from the contact-side inner surface in contact with each lens 111, 113, and 115 to the outer surface. Here, the inner diameter of the lower barrel portion 510 is the inner diameter of the inner surface in contact with each lens 111, 113, 115, and is divided into a first inner diameter which is the inner side of the first outer diameter, the second inner diameter which is the inner side of the second outer diameter, and the third inner diameter which is the inner side of the third outer diameter, the following relationship may be satisfied: first inner diameter<second inner diameter<third inner diameter.

Table 1 shows lens data of the first lens 111 to the third lens 115 according to an embodiment of the invention.

TABLE 1

| Lens | Surface | Radius (mm) of curvature | Thickness(mm)/ Interval(mm) | Index | Effective radius (mm) |
|---|---|---|---|---|---|
| Lens 1 | S1 | 2.842 | 1.478 | 2.013 | 2.788 |
| | S2 (Stop) | 4.145 | 0.673 | | 1.46 |
| Lens 2 | S3 | −8.27 | 1.052 | 1.632 | 1.993 |
| | S4 | −3.83 | 0.375 | | 2.7 |
| Lens 3 | S5 | 1.748 | 0.591 | 1.632 | 3.186 |
| | S6 | 1.56 | 0.279 | | 3.94 |
| Optical | S7 | 1.00E+18 | 0.3 | 1.513 | 4.169 |
| filter | S8 | 1.00E+18 | 0.5 | | 4.275 |
| Cover | S9 | 1.00E+18 | 0.4 | 1.513 | 4.548 |
| glass | S10 | 1.00E+18 | 0.045 | | 4.689 |
| Image sensor | | 1.00E+18 | 0 | | 4.529 |

In Table 1, the interval between the first lens 111 and the second lens 113 on the optical axis may be greater than the interval between the second lens 113 and the third lens 115. At least one or both of the object-side fifth surface S5 and the sensor-side sixth surface S6 of the third lens 115 may have an inflection point. For example, the position of the inflection point of the sixth surface S6 may be disposed at a position farther than the position of the inflection point of the fifth surface S5 with respect to the optical axis, and may be disposed in range in 50% to 80% of the distance from the optical axis to the end of the effective diameter. The seventh surface may be an object-side surface of the optical filter, an eighth surface may be a sensor-side surface, a ninth surface may be an object-side surface of the cover glass, and the tenth surface may be a sensor-side surface. The size of the image sensor may be a length in a horizontal or vertical direction, and a length in a diagonal direction may be about 4.7 mm. In an embodiment of the invention, in order to alleviate the thermal strain of the second and third lenses 113 and 115, the material of the lens barrel 500 may be a heat dissipation material or a metal material. The top view shape of the lens barrel 500 may include a circular column shape or a polygonal column shape. The lens barrel 500 may be formed of a resin or a plastic or metal material. A hydrophilic material may be coated or applied to the surface of the lens barrel 500. Here, the lens barrel 500 may be selected from a metal material, for example, Al, Ag, or Cu, and may be Al or an Al alloy. When the lens barrel 500 is made of metal, heat transferred in the lateral direction of the lenses 111, 113, and 115 may be dissipated, and thermal strain of the lenses 111, 113, and 115 may be suppressed.

The first and second light blocking films 121 and 124, the spacing member 123, or the support member 125 may have openings therein, and the flange portions 111A, 113A, 115A and the lens barrels 500 may be adhered to the inner surface 511. The first and second light blocking films 121 and 124, the spacing member 123, and the support member 125 may include a poly ethylene film (PE) or a polyester (PET)-based film. As another example, the first and second light blocking films 121 and 124, the spacing member 123, or the support member 125 may have a metal or alloy and an oxide film formed on the surface thereof. Materials included in the metal or alloy may include at least one of In, Ga, Zn, Sn, Al, Ca, Sr, Ba, W, U, Ni, Cu, Hg, Pb, Bi, Si, Ta, H, Fe, Co, Cr, Mn, Be, B, Mg, Nb, Mo, Cd, Sn, Zr, Sc, Ti, V, Eu, Gd, Er, Lu, Yb, Ru, Y, and La. The oxide film may be a black oxide or a brown oxide-treated oxide material using copper.

The image sensor 192 may be disposed on the main board 190. The image sensor 192 may be mounted, seated, contacted, fixed, temporarily fixed, supported, or coupled to the main board 190 on a plane intersecting the optical axis Lz. Alternatively, according to another embodiment, a groove or a hole (not shown) capable of accommodating the image sensor 192 may be formed in the main board 190, and in an embodiment, the image sensor 192 is not limited to a specific shape disposed on the main board 180. The main board 190 may be a rigid PCB or an FPCB.

The image sensor 192 may perform a function of converting light passing through the lens unit 100 into image data. A sensor holder may be disposed under the housing 500 to surround the image sensor 192 and protect the image sensor 192 from external foreign matter or impact. The image sensor 192 may be any one of a charge coupled device (CCD), a complementary metal-oxide semiconductor (CMOS), a CPD, and a CID. When there is a plurality of image sensors 192, one may be a color (RGB) sensor, and the other may be a black and white sensor.

The optical filter 196 may be disposed between the lens unit 100 and the image sensor 192. The optical filter 196 may filter light corresponding to a specific wavelength range with respect to the light passing through the lenses 111, 113, 115, and 117. The optical filter 196 may be an infrared (IR) blocking filter that blocks infrared rays or an ultraviolet (UV) blocking filter that blocks ultraviolet rays, but the embodiment is not limited thereto. The optical filter 196 may be disposed on the image sensor 192. The cover glass 194 is disposed between the optical filter 196 and the image sensor 192, protects an upper portion of the image sensor 192, and may inhibit deterioration of reliability of the image sensor 192.

The camera module 1000 according to an embodiment of the invention may include a driving member (not shown), wherein the driving member may move or tilt a barrel including at least one of the lenses in an optical axis direction and/or a direction orthogonal to the optical axis direction. The camera module may include an Auto Focus (AF) function and/or an Optical Image Stabilizer (OIS) function.

The camera module 1000 according to an embodiment of the invention may be applied to an infrared camera or a driver monitoring camera. In addition, the angle of view of the camera module 1000 may be provided in a range of 50 degrees or more, for example, in the range of 50 degrees to 70 degrees. Here, when the lens unit 100 mixes and stacks plastic lenses and at least one glass lens, thermal strain due to the plastic lenses may be minimized. For example, since the first and second contact surfaces S21 and S31 of the second and third lenses 113 and 115 have the lengths D2 and T2 that may be compensated according to the thermal strains F2 and F3, the MTF change rate of the diffraction optical performance at a high temperature (e.g., 80 degrees to 105 degrees) compared to the room temperature (e.g., 20 degrees to 30 degrees) may be 10% or less. The high temperature may include a temperature inside the vehicle.

FIGS. 6*a* and 6*b* are diagrams comparing the distribution of thermal stress (unit, Mpa) in a comparative example and a camera module of the invention. In the comparative example of FIG. 6*a*, the outside surfaces of the flange portions of the first, second, and third lenses are vertical, and are in contact with the inner surface of the lens barrel. FIG. 6*b* is an example of contact between the flange portions 111A, 113A, and 115A of the first, second, and third lenses of FIGS. 1 to 5 and the inner surface 511 of the lens barrel 500.

In FIG. 6*a*, the stress value of the third object-side surface of the second lens on the optical axis is 3.403, and the stress value of the sensor-side fourth surface of the second lens is 1.063, but as shown in FIG. 6*b*, it may be seen that the stress value of the third object-side surface of the second lens is less than 3, for example, 2.643, and the stress value of the sensor-side fourth surface of the second lens is less than 1, for example, 0.979. The stress of the invention is lower than that of the comparative example based on the second lens. Similarly, in the comparative example, it may be seen that the stress value of the fifth object-side surface of the third lens is 5.538, and it may be seen that the stress value of the object-side fifth surface of the third lens of the invention is less than 5, for example, 4.436.

FIGS. 7*a* and 7*b* are diagrams comparing the distribution of strain ration (unit, μm/μm) in the camera module of the comparative example and the invention. In FIG. 7*a*, it may be seen that the strain ratio value of the third object-side surface of the second lens on the optical axis is $1.036\times10^{-3}$, and it may be seen that the strain ratio values for each point on the object-side fifth surface of the third lens are $2.507\times10^{-3}$, $1.587\times10^{-3}$ and $2.507\times10^{-3}$, respectively. On the other hand, in FIG. 7*b*, it may be seen that the strain ratio value of the third object-side surface of the second lens may be lower, for example, $9.262\times10^{-4}$, and the strain ratio values at each point of the object-side fifth surface of the third lens may be lower as $1.822\times10^{-3}$, $1.291\times10^{-3}$, and $1.822\times10^{-3}$, respectively. Each point on the fifth surface of the object side of the third lens is a value measured at an optical axis and a position of the inflection point on both sides of the optical axis.

In the optical system according to an embodiment of the invention, the angle of view (diagonal) may be 70 degrees or less, for example, in the range of 50 degrees to 70 degrees. In the optical system, the distance TTL between the apex of the image sensor 192 and the first lens 111 may be 11 mm or less, and the wavelength of the light used may be in the range of 870 nm to 1000 nm. FIGS. 6*a* and 6*b* are graphs showing the diffraction MTF (Modulation transfer function) at high temperature in the optical system of the comparative example and the optical system of the invention.

"Stress due to heat" described in the following description means the applied stress to the object-side surface and the sensor-side surface caused by the expansion of the lens by heat from room temperature (e.g., 20 degrees to 30 degrees) to high temperature (e.g., 80 degrees to 105 degrees). In addition, "temperature change" described in the following description means a change from room temperature (e.g., 20 degrees to 30 degrees) to high temperature (e.g., 80 degrees to 105 degrees).

Referring to FIGS. 9*a*-11*b* are examples of testing the effect of thermal stress according to the contact area of any lens L1 in contact with the lens barrel LB in the camera module according to an embodiment of the invention. The lens L1 may be a second lens or a third lens among the first to third lenses. The lens L1 may be a plastic lens or an aspherical lens among lenses.

Figure 10:
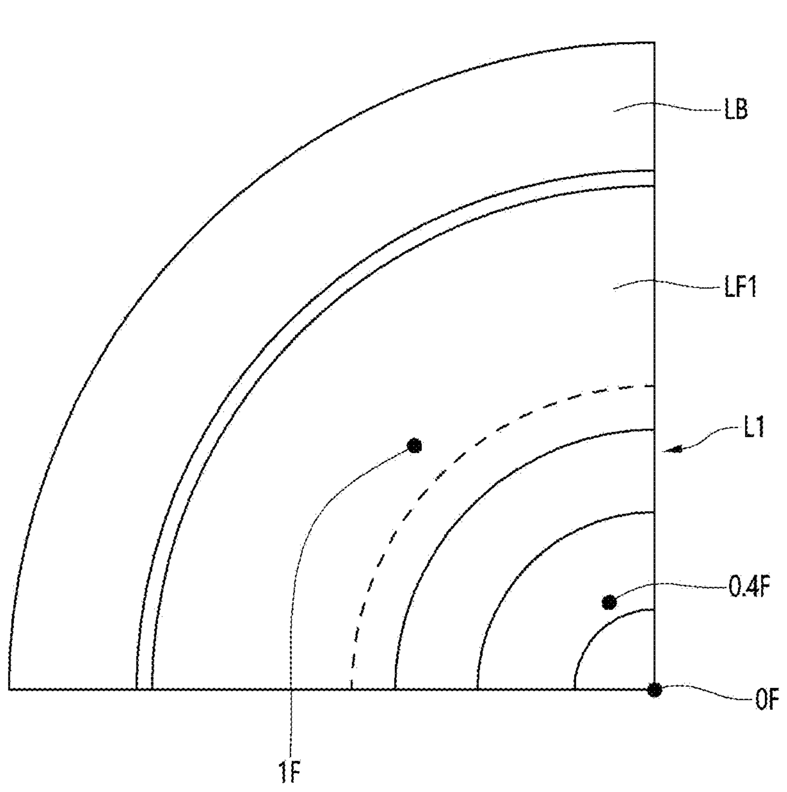
FIG. 10 is an example of a partial plan view of the lens and the lens barrel of FIG. 9 as viewed from the object-side surface or the sensor-side surface.

FIGS. 9*a*-9*d* are views comparing a contact ratio between a flange portion of a lens and a lens barrel in a camera module according to an embodiment of the invention, and FIG. 10 is an example of a partial plan view viewed from the object-side surface C1 or the sensor-side surface C2 with respect to the lens L1 and the lens barrel LB of FIGS. 9*a*-9*d*, and FIGS. 11*a* and 11*b* are graphs measuring the thermal stress of the object-side surface and the sensor-side surface according to the contact ratio between the lens barrel and the flange portion of the lens of FIGS. 9*a*-9*d*. Here, in the lens L1, the object-side surface C1 may be convex and the sensor-side surface C2 may be concave on the optical axis. As another example, the lens L1 may have a convex object-side surface and a convex sensor-side surface on the optical axis. As another example, the lens L1 may have a concave object-side surface and a concave sensor-side surface on the optical axis. As another example, the lens L1 may have a concave object-side surface and a convex sensor-side surface on the optical axis. The number of lenses having the contact ratio or contact length in the camera module may be two or less, or may range from 20% to 75% of the number of lenses in the camera module.

Referring to FIGS. 9*a*-11*b*, the lens L1 includes a flange portion LF1 in contact with the lens barrel LB. The thickness LF1_T of the flange portion LF1 may be a distance between a surface contacting the optical member among the object-side surfaces of the lens and a surface contacting the optical member among the sensor-side surfaces of the lens. Alternatively, the thickness LF1_T of the flange portion LF1 is the distance between the flat object-side surface and the flat sensor-side surface in a region outside the effective region of the lens, and may be in the range of 0.6 mm to 1.2 mm or 0.6 mm to 1 mm. In addition, the contact length LF1_CT of the flange portion LF1 with the lens barrel LB from the outer surface may be smaller than the thickness LF1_T of the flange portion LF1. At this time, the contact length LF1_CT was tested at 70%, 60%, 50%, 40%, 30%, 20%, and 10% of the thickness LF1_T of the flange portion LF1, in FIGS. 9*a*-9*d*, the contact length LF1_CT of the flange portion LF1 is shown as an example of 70%, 50%, 30%, and 20% of the thickness LF1_T of the flange portion LF1.

Figure 11A:
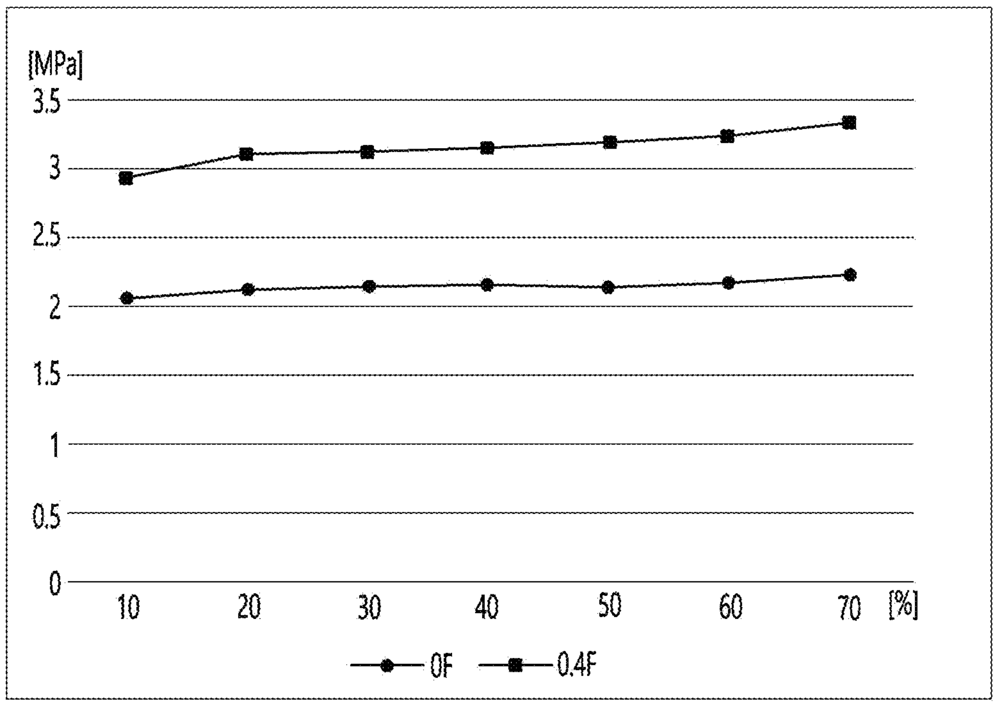
FIGS. 11*a* and 11*b* are graphs of measuring stress due to thermal expansion of the object-side surface and the sensor-side surface according to the contact ratio between the lens barrel and the flange portion of the lens of FIGS. 9*a*-9*d*.
Figure 11B:
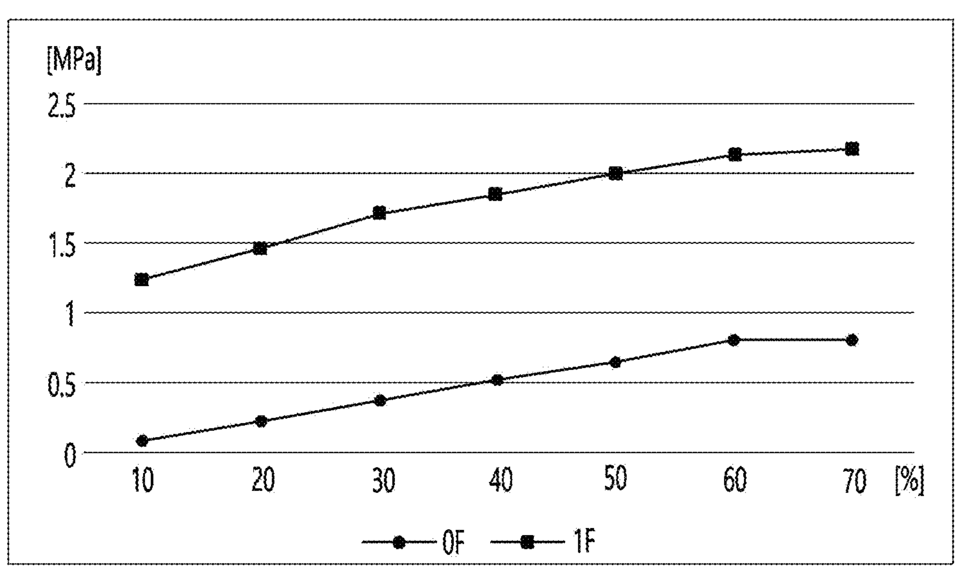

As shown in FIGS. 10-11*b*, the object-side surface C1 of the lens L1 according to the ratio of the contact length LF1_CT was measured the stress caused by heat at the optical axis or lens center OF and peripheral positions, for example, 0.4F, that is, and was measured the stress caused by thermal expansion from room temperature to high temperature, and the sensor side surface C2 was measured the stress due to heat at the optical axis or the lens center and peripheral positions, for example, at a position of 0.4F. Here, when the center (or optical axis) of the lens is OF, and the length from the lens center to the end of a diagonal line orthogonal to the optical axis is 1F, 0.4F and 1F positions may be set. Here, 1F is the position of the diagonal end of the image sensor, and may be, for example, 4.7 mm±0.2 mm, and 0.4F may be, for example, 1.88 mm±0.1 mm. Here, OF is the optical axis or the center of each lens, and 1F is the end of the effective region of each lens.

FIG. 11*a* shows the stress value due to heat and a linear graph passing the values at 0F position and 0.4F, when the contact length LF1_CT on the object-side surface C1 of the lens L1 of FIGS. 9*a*-9*d* is 10% to 70% compared to the thickness LF1_T of the flange portion LF1, and there is little change in the stress values in the range where the contact length is 20% to 50% of the thickness of the flange portion, and it may be seen that the stress difference between 0F and 0.4F is smaller than the stress difference at 60% or 70% in the range of 20% to 50%. When the contact length LF1_CT in the range of 20% to 50% is 0.8 mm, it may be in the range of 0.24 mm to 0.40 mm.

FIG. 11*b* shows the stress value due to heat and a linear graph passing the values at 0F position and 1F, when the contact length LF1_CT on the sensor-side surface C2 of the lens L1 of FIGS. 9*a*-9*d* is 10% to 70% compared to the thickness LF1_T of the flange portion LF1, where the contact length is in the range of 20% to 50% of the thickness of the flange portion, the change in thermal stress values is constantly increased, and the thermal stress sum between 0F and 1F may be seen that values in the range of 20% to 50% are less than the sum of thermal stresses at 60% or 70%. In the sensor side, the thermal stress may have a higher value at the 1F position than at the 0F position. Here, 1F is the position of the diagonal end of the image sensor, and may be, for example, 4.7 mm±0.2 mm, and 0.4F may be, for example, 1.88 mm±0.1 mm.

As shown in FIGS. 11*a* and 11*b*, it may be seen that when the contact length of the flange portion of the lens may stably manage the thermal stress in the range of 20% to 50% in the object-side surface and the sensor-side surface. In addition, as the contact length decreases, thermal stress may be reduced, but when the contact length is less than 20% of the thickness of the flange portion, there are many difficulties in manufacturing or processing the lens.

Table 2 below shows thermal stress (MPa) values obtained by measuring 0F and 0.4F or 0F and 1F values according to the contact length of the flange on the object-side surface C1 and the sensor-side surface C2 of the lens, respectively.

TABLE 2

| | C1 | | C2 | |
|---|---|---|---|---|
| Contact length (%) | 0F [MPa] | 0.4F [MPa] | 0F [MPa] | 1F [MPa] |
| 70 | 2.22 | 3.33 | 0.8 | 2.19 |
| 60 | 2.18 | 3.24 | 0.79 | 2.14 |
| 50 | 2.15 | 3.19 | 0.64 | 2.01 |
| 40 | 2.16 | 3.15 | 0.5 | 1.85 |
| 30 | 2.14 | 3.13 | 0.36 | 1.71 |
| 20 | 2.12 | 3.11 | 0.21 | 1.46 |
| 10 | 2.05 | 2.94 | 0.06 | 1.23 |

In Table 2, 0F is the center or optical axis of the lens, 1F is the position of the diagonal end of the image sensor, and may be, for example, 4.7±0.2 mm, and 0.4F may be, for example, 1.88±0.1 mm. FIGS. 12*a* to 14 is an example of testing the effect of the heat stress according to the difference between radii of curvature of the object-side surface C1 and the sensor-side surface C2 of any lens L2 in contact with the lens barrel LB in the camera module according to the embodiment of the invention. The lens L2 may be a second lens or a third lens among the first to third lenses, or a plastic lens or an aspherical lens among the lenses.

Figures 12A, 12B, 12C, 12D:
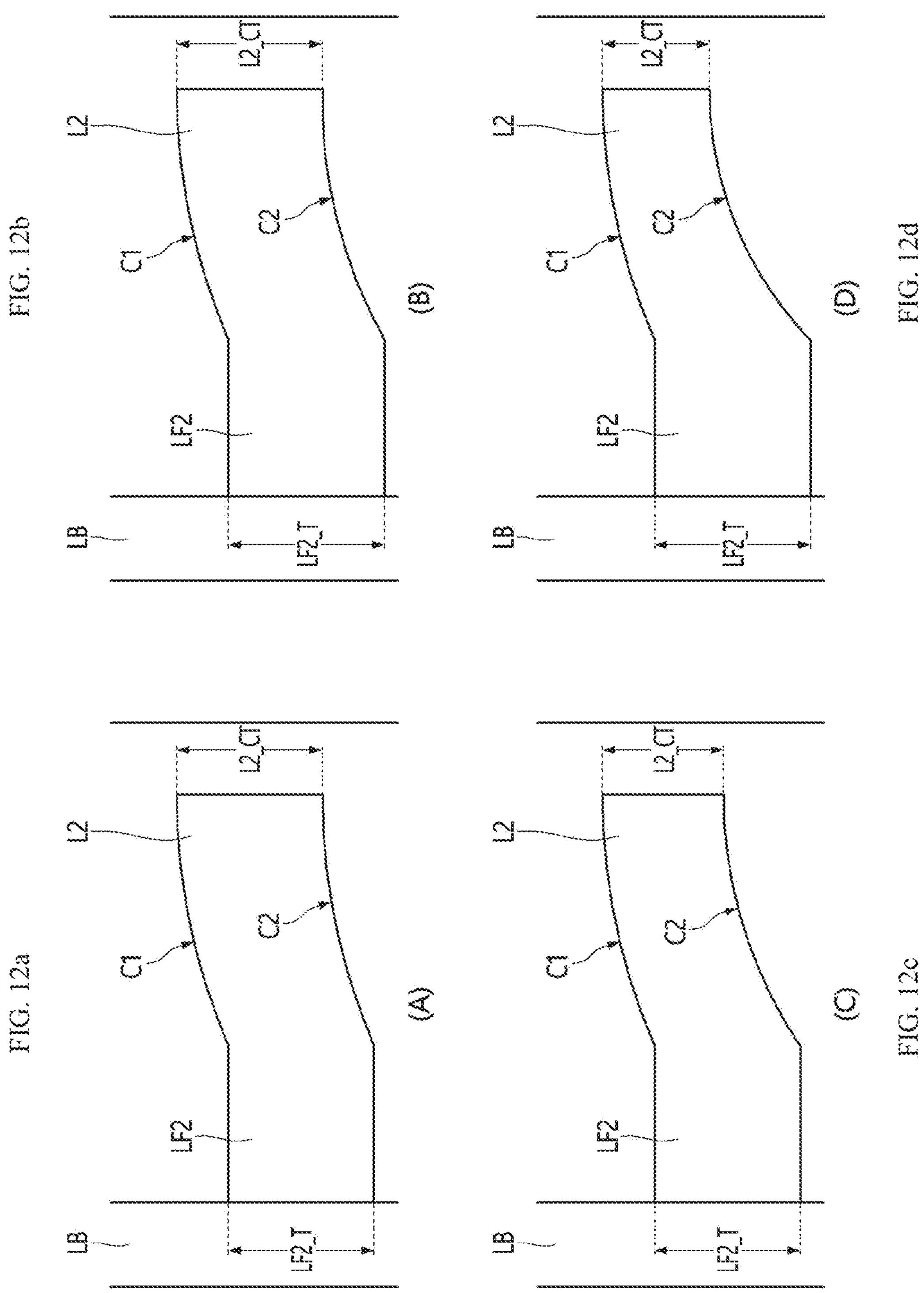
FIGS. 12*a*-12*d* are diagrams comparing the difference in curvature radius between the object-side surface of the lens and the sensor-side surface in the camera module according to an embodiment of the invention.
Figure 13:
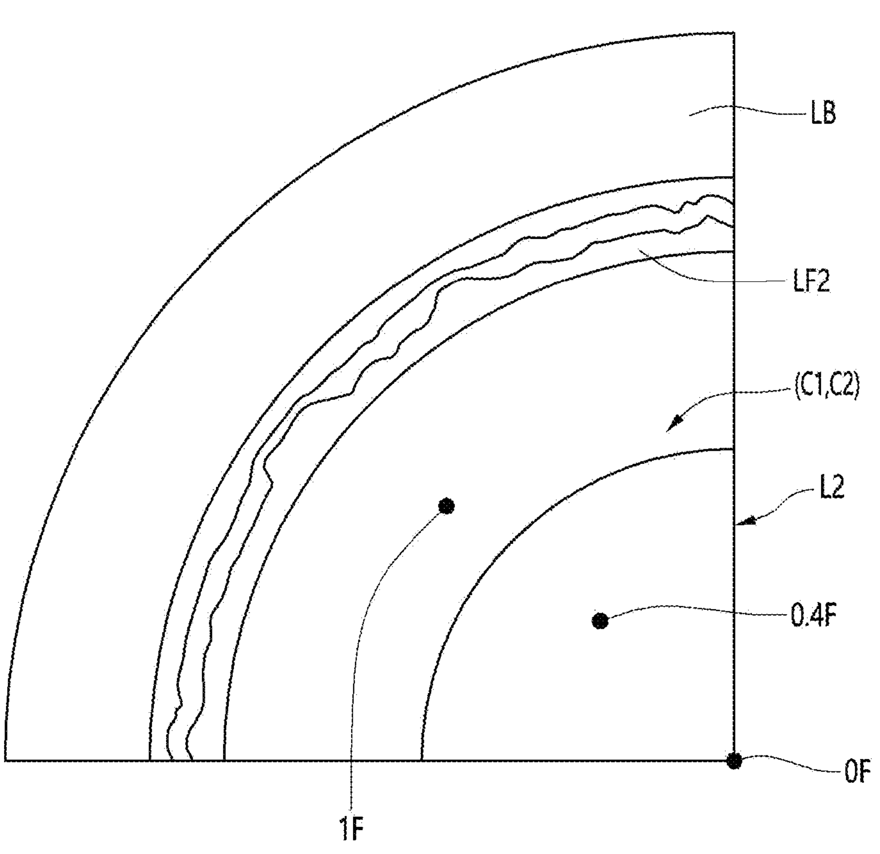
FIG. 13 is an example of a partial plan view of the lens of FIGS. 12*a*-12*d* viewed from the object-side surface or the sensor-side surface.

FIGS. 12*a*-12*d* are views comparing the difference (C1-C2) between radii of curvature of two surfaces C1 and C2 of the lens L2 in the camera module according to an embodiment of the invention, FIG. 13 is an example of a partial plan view viewed from the object-side surface C1 or the sensor-side surface C2 of the lens L2 of FIGS. 12*a*-12*d*, and FIG. 14 is a graph measuring the thermal stress at each location according to the difference (C1-C2) between the radii of curvature of the object-side surface C1 and the sensor-side surface C2 of the lens of FIGS. 12*a*-12*d*. Here, the lens L2 may have a convex object-side surface and a concave sensor-side surface on the optical axis. As another example, the lens L2 may have a convex object-side surface and a convex sensor-side surface on the optical axis. As another example, the lens L2 may have a concave object-side surface and a concave sensor-side surface on the optical axis. As another example, the lens L2 may have a concave object-side surface and a convex sensor-side surface on the optical axis. The number of lenses having the object-side surface and the sensor-side surface in the camera module may be one, two, or 20% to 75% of the number of lenses in the camera module.

Referring to FIGS. 12*a* to 14, the lens L2 includes a flange portion LF2 in contact with the lens barrel LB. The thickness LF2_T of the flange portion LF2 may be in the range of 0.6 mm to 1.2 mm or 0.6 mm to 1 mm, and the contact length at which the flange portion LF2 is in contact with the lens barrel LB from among the outsides is 100% of the thickness LF2_T of the flange portion LF2 as an example, but may be changed in the range of 30% to 50%. The difference between radii of curvature of the object-side surface C1 and the sensor-side surface C2 was tested as 0 mm, 0.5 mm, 1 mm, 1.5 mm, 2 mm, and 2.5 mm, respectively. Here, an example of testing with the constant radius of curvature of the object-side surface C1 and gradually decreasing the radius of curvature of the sensor-side surface C2, but the radius of curvature of the object-side surface C1 is gradually reduced, a difference between radii of curvature of two surfaces C1 and C2 may gradually decrease, or the radii of curvature of the two surfaces may gradually increase. The radius of curvature may be expressed as an absolute value.

Figure 14:
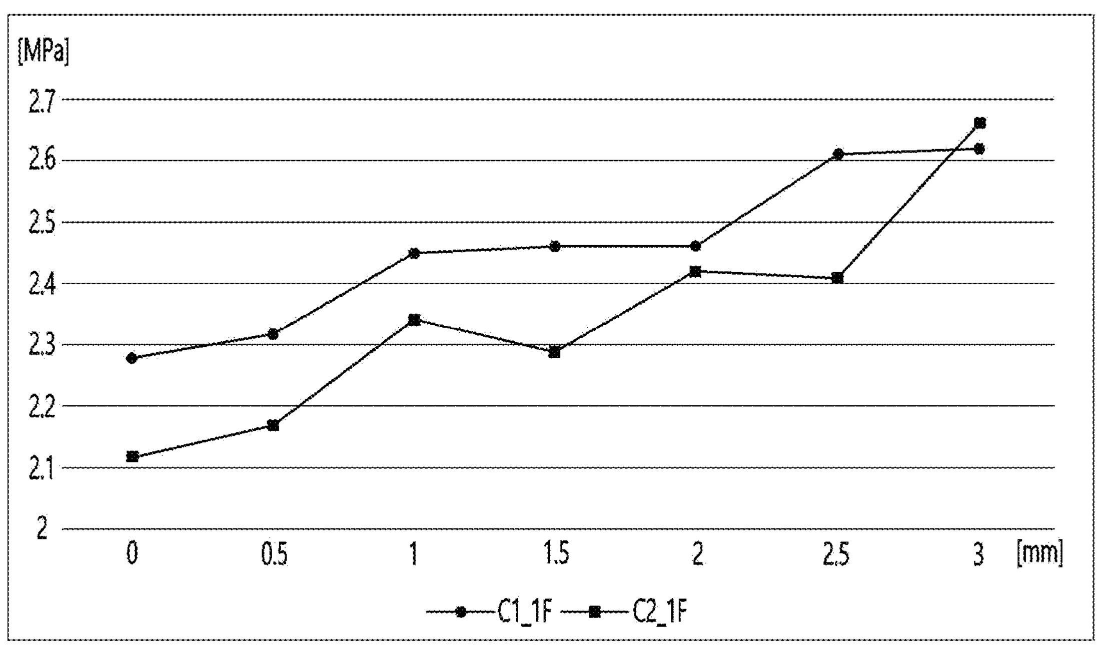
FIG. 14 is a graph of measuring stress due to thermal expansion at each position of the object-side surface and the sensor-side surface according to the difference between the radii of curvature of the object-side surface and the sensor-side surface of the lens of FIGS. 12*a*-12*d*.

In FIGS. 12*a*-12*d*, the difference between the radii of curvature of the two surfaces C1 and C2 of the lens L2 is shown as an example of 0 mm, 1 mm, 2 mm, and 3 mm, and in FIG. 14, the difference between the radii of curvature of the two surfaces C1 and C2 of the lens L2 is 0 mm, 0.5 mm, 1 mm, 1.5 mm, 2 mm, 2.5 mm, and 3 mm, respectively, and each tested value may be obtained. FIGS. 12*a* and 14 shows the measurement of thermal stress at the 1F position corresponding to the outer edge of the image sensor on the object-side surface C1 or the sensor-side surface C2 of the lens L2 according to the difference between the radii of curvature, where OF is the center or optical axis of the lens, 1F is the position of the diagonal end of the image sensor, for example, may be 4.7 mm±0.2 mm.

FIG. 14 is a graph showing the stress values due to heat at the 1F position of the object-side surface C1 and the sensor-side surface C2 at high temperature 105° C. and a linear graph passing those values when the difference between the radii of curvature between the object-side surface C1 and the sensor-side surface C2 in the optical axis of the lens L2 of FIGS. 12*a*-12*d* is changed from 0 mm to 3 mm in 0.5 mm increments, and it may be seen that when the difference between the radii of curvature is in the range of 0 mm to 2 mm, 0 mm to 1 mm, or 0 mm to 0.5 mm, the stress value due to heat is less than or equal to a certain value. That is, the thermal stress on the object-side surface C1 and the sensor-side surface C2 is stable with respect to the difference in the radii of curvature from 0 mm to 2 mm at the outermost position 1F of the image sensor, and the thermal stress is less than 2.5 MPa may be suppressed. In the object-side surface C1 and the sensor-side surface C2, the thermal stress may be suppressed to 2.45 MPa or less for the difference between the radii of curvature from 0 mm to 1 mm at the outermost position 1F of the image sensor. The thermal stress of the object-side surface C1 and the sensor-side surface C2 may be suppressed to 2.35 MPa or less for the difference between the radii of curvature from 0 mm to 0.5 mm at the outermost position 1F of the image sensor.

When the thermal stress at the outermost position IF of the image sensor is 2.35 MPa or more, more specifically 2.45 MPa or more, and more specifically 2.5 MPa or more, the MTF performance, which is the optical performance of an image captured at a high temperature 105° C., may deteriorate.

Referring to FIG. 14, it may be seen that the thermal stress of the sensor-side surface C2 having a radius of curvature smaller by 0.5 mm is not stable. This means that the surface with a relatively small radius of curvature is more vulnerable to stress due to heat than the surface with a large radius of curvature. Therefore, since the invention is designed so that the center of the surface of the flange portion in contact with the inner surface of the barrel is located close to the surface with a large radius of curvature, it was intended to reduce the stress caused by the heat to the surface with a small radius of curvature according to the change from room temperature 20° C.-30° C. to high temperature 105° C. By reducing the surface in contact with the inner surface of the barrel at the flange portion located close to the lens surface with the small radius of curvature, the heat stress on the lens surface with the small radius of curvature may reduce according to the change from room temperature 20° C.-30° C. to high temperature 105° C.

Table 3 below is a table showing thermal stress (MPa) measured at the 1F position according to the difference between the radii of curvature of the object-side surface C1 and the sensor-side surface C2 of the lens L2, respectively.

TABLE 3

| Difference (mm) between radii of curvature | C1 [MPa] | C2 [MPa] |
|---|---|---|
| 0 | 2.28 | 2.12 |
| 0.5 | 2.32 | 2.17 |
| 1 | 2.45 | 2.34 |
| 1.5 | 2.46 | 2.29 |
| 2 | 2.46 | 2.42 |
| 2.5 | 2.61 | 2.41 |
| 3 | 2.62 | 2.66 |

In Table 3, the object-side surface C1 may be convex or concave on the optical axis, and the sensor-side surface C2 may be convex or concave on the optical axis. 0F is the center or optical axis of the lens, 1F is the position of the diagonal end of the image sensor, for example, may be in the range of 4.7 mm±0.2 mm. In FIG. 14 and Table 3, as the difference between the radii of curvature of the object-side surface and the sensor-side surface increases, the stress due to heat applied to the object-side surface and the sensor-side surface increases. In the embodiment of the invention, in the difference between the radii of curvature of the object-side surface and the sensor-side surface of the lens, stress due to heat should be suppressed in the range of 2 mm or more, specifically in the range of 1 mm or more, and more specifically in the range of 0.5 mm or more. In the invention, the thermal stress applied to the lens may be more effectively suppressed through the contact length between the flange portion of the lens and the inner surface of the lens barrel. As the difference between the radii of curvature of the lens surfaces increases, the stress and strain may increase, but the contact length of the flange portion of the lens may be adjusted in the range of 30% to 50% of the thickness of the flange portion to suppress the portion affecting the optical performance. In addition, In addition, by designing the center of the surface in contact with the flange portion and the inner surface of the barrel to be located close to the lens surface with a large radius of curvature, it was attempted to reduce thermal stress on the lens surface with a small radius of curvature according to a change in temperature. By reducing the surface in which the flange portion located close to the lens surface with the small radius of curvature contacts the inner surface of the barrel, heat stress on the lens surface with the small radius of curvature according to temperature changes can be reduced. In addition, by designing the center of the surface in contact with the inner surface of the barrel to be located close to the lens surface with the large radius of curvature, it was attempted to reduce the thermal stress applied to the lens surface with the small radius of curvature as the temperature changes. By reducing the surface in which the flange portion located close to the lens surface with the small radius of curvature is in contact with the inner surface of the barrel, it is possible to reduce the stress caused by heat on the lens surface with the small radius of curvature as the temperature changes.

Figure 15:
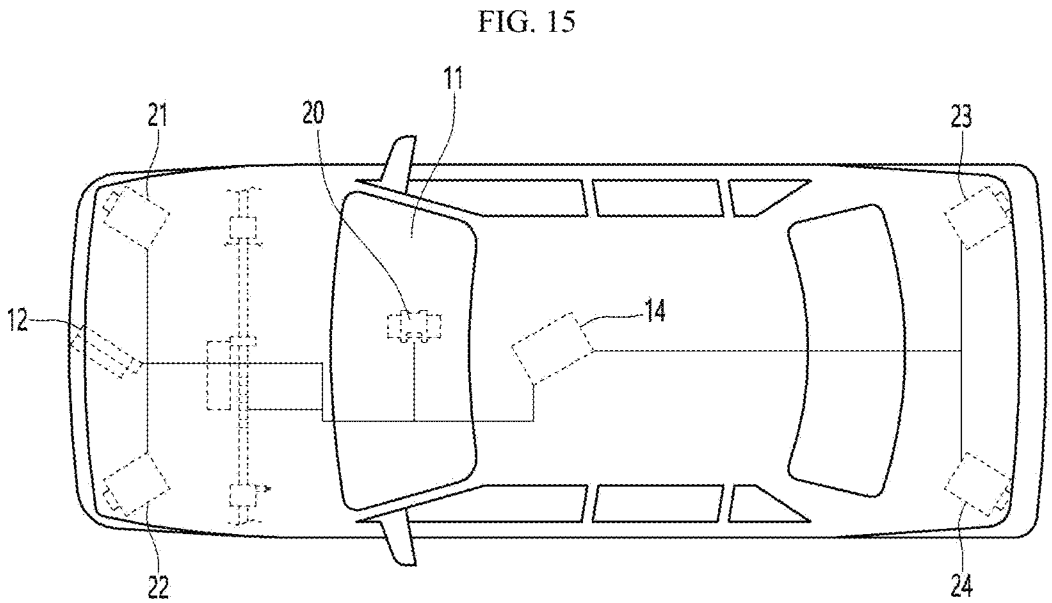
FIG. 15 is a plan view illustrating an example of a vehicle having a camera module according to an embodiment of the invention.

FIG. 15 is an example of a plan view of a vehicle to which a camera module according to an embodiment of the invention is applied.

Referring to FIG. 15, the vehicle camera system according to the embodiment of the invention includes an image generating portion 11, a first information generating portion 12, second information generating portions 21, 22, 23, and 24, and a control portion 14. The image generating portion 11 may include at least one camera module 20 disposed in the own vehicle, and may generate a front image of the own vehicle or an image inside the vehicle by photographing the front and/or driver of the own vehicle. In addition, the image generating portion 11 may generate an image captured by the driver or the surroundings of the own vehicle in one or more directions as well as in front of the own vehicle by using the camera module 20.

Here, the front image and the surrounding image may be a digital image, and may include a color image, a black-and-white image, and an infrared image. In addition, the front image and the surrounding image may include a still image and a moving image. The image generating portion 11 provides the driver image, the front image, and the surrounding image to the control portion 14. Next, the first information generating portion 12 may include at least one radar and/or a camera disposed on the own vehicle, and generates first detection information by detecting the front of the own vehicle. Specifically, the first information generating portion 12 is disposed in the own vehicle, and generates the first sensing information by detecting the positions and speeds of vehicles located in front of the own vehicle, the presence and location of pedestrians, and the like. It is possible to control to maintain a constant distance between the own vehicle and the vehicle in front by using the first detection information generated by the first information generating portion 12, and when the driver wants to change the driving lane of the own vehicle or in a specific preset case, such as when the vehicle is parked in reverse, the stability of the vehicle operation may be improved. The first information generating portion 12 provides the first detection information to the control portion 14. Next, the second information generating portions 21, 22, 23, and 24 is sensed to generate second sensing information from each side of the own vehicle according to the front image generated by the image generating portion 11 and the first sensing information generated by the first information generating portion 12. Specifically, the second information generating portions 21, 22, 23, and 24 may include at least one radar and/or camera disposed on the own vehicle, and detect the positions and speeds of vehicles located on the side of the own vehicle, or take a video. Here, the second information generating portions 21, 22, 23, and 24 may be disposed on both sides of the front and rear of the own vehicle, respectively.

Such a vehicle camera system may include the following camera module, and it is possible to protect the vehicle and object form the automatic driving or surrounding safety by providing or processing information obtained through the front, rear, each side or corner regions of the own vehicle to the user. A plurality of optical systems of the camera module according to an embodiment of the invention may be mounted in a vehicle for safety regulation, reinforcement of autonomous driving functions, and increased convenience. In addition, the optical system of the camera module is a part for control such as a lane keeping assistance system (LKAS), a lane departure warning system (LDWS), and a driver monitoring system (DMS), and is applied in a vehicle. Such a vehicle camera module can realize stable optical performance even when ambient temperature changes and provide a module with competitive price, thereby securing reliability of vehicle components.

In the camera module of a vehicle according to the embodiment of the invention, when a spacer having a buffer structure is applied to the outside of at least one lens for a temperature change from a low temperature of −20 degrees or less to a high temperature of 70 degrees or more, for example, a change in the range of −40 degrees to 85 degrees or −40 degrees to 105 degrees, by relaxing the lens having a high coefficient of the thermal expansion in the length direction, it is possible to provide elasticity to be contracted or expanded with respect to the expansion of the lens made of plastic or glass, and to suppress the amount of change in the optical axis direction of the effective diameter region of the lens. Accordingly, it is possible to reduce a change in optical characteristics of a camera module employing a lens made of plastic or glass. In addition, the outer flange portion of the lens may further include a buffer structure, it is possible to suppress the elastic deformation of the lens itself.

Features, structures, effects, etc. described in the above embodiments are included in at least one embodiment of the invention, and are not necessarily limited to only one embodiment. Furthermore, features, structures, effects, etc. illustrated in each embodiment may be combined or modified for other embodiments by those of ordinary skill in the art to which the embodiments belong. Accordingly, the contents related to such combinations and modifications should be interpreted as being included in the scope of the invention. In addition, although the embodiment has been described above, it is only an example and does not limit the invention, and those of ordinary skill in the art to which the invention pertains are exemplified above in a range that does not depart from the essential characteristics of the present embodiment. It may be seen that various modifications and applications that have not been made are possible. For example, each component specifically shown in the embodiment may be implemented by modification. And the differences related to these modifications and applications should be construed as being included in the scope of the invention defined in the appended claims.

The invention claimed is:

1. A camera module comprising:

a lens barrel having a through hole therein; and a first lens, a second lens, and a third lens coupled to the through hole of the lens barrel and aligned with an optical axis from an object side toward a sensor side, wherein lenses of the optical system consist of three lenses, wherein the first lens is made of a glass material, wherein the second lens is made of a plastic material, wherein the first lens includes a first flange portion and an object-side first surface and a sensor-side second surface, wherein the second lens includes a second flange portion extending from the optical axis toward an inner surface of the lens barrel, wherein the third lens includes a third flange portion extending from the optical axis toward the inner surface of the lens barrel, wherein the second flange portion includes a first contact surface (S21) that is disposed in parallel to the optical axis and contacts the inner surface of the lens barrel, and a first non-contact surface (S22) that is disposed in parallel to the optical axis and does not contact the inner surface of the lens barrel, wherein the third flange portion includes a second contact surface (S31) that is disposed in parallel to the optical axis and contacts the inner surface of the lens barrel, and a second non-contact surface (S32) that is disposed in parallel to the optical axis and does not contact the inner surface of the lens barrel, wherein a vertical length (D5) of the first non-contact surface in a direction of the optical axis is longer than a vertical length (T5) of the second non-contact surface, wherein a total thickness (D1) of the second flange portion is thicker than a total thickness (T1) of the third flange portion, wherein an object-side third surface and a sensor-side fourth surface of the second lens have different radii of curvature on the optical axis, and wherein a center of the first contact surface where the second flange portion of the second lens contacts the inner surface of the lens barrel is located closer to a side having a greater radius of curvature among the third surface and the fourth surface based on a center of the total thickness of the second flange portion of the second lens, and the radii of curvature of the third and fourth surfaces are expressed as absolute values.

2. The camera module of claim 1, wherein the center of the first contact surface is located closer to an object side of the second flange portion of the second lens than the center of the total thickness of the second flange portion of the second lens in the direction of the optical axis.

3. The camera module of claim 1, wherein a difference between the radii of curvature of the third surface and the fourth surface is 1 mm or more.

4. The camera module of claim 3, wherein the third surface has the radius of curvature greater than the radius of curvature of the fourth surface, and wherein the center of the first contact surface is located closer to an object side of the second flange portion of the second lens than the center of the total thickness of the second flange portion of the second lens in the direction of the optical axis.

5. The camera module of claim 1, wherein the first to third lenses are spaced apart from one another, and are configured to be used in an infrared camera.

6. The camera module of claim 1, wherein a diameter of the first lens is smaller than a diameter of the second lens.

7. The camera module of claim 1, wherein the camera module is configured to be used in a driver monitoring camera.

8. The camera module of claim 1, wherein an angle of view is in a range of 50 degrees to 70 degrees.

9. The camera module of claim 1, wherein the total thickness of the second flange portion of the second lens is a distance between an object-side surface of the second flange portion of the second lens and the sensor-side surface of the second flange portion of the second lens, the distance being a distance parallel to the optical axis, and wherein the object-side surface and the sensor-side surface of the second flange portion are surfaces in contact with a spacing member or a light blocking film.

10. The camera module of claim 1, wherein the third surface of the second lens has a concave shape on the optical axis, and wherein the fourth surface of the second lens has a convex shape on the optical axis.

11. The camera module of claim 1, wherein an object-side fifth surface of the third lens has a convex shape on the optical axis, wherein a sensor-side sixth surface of the third lens has a concave shape on the optical axis, wherein the third lens is made of a plastic material.

12. The camera module of claim 11, wherein a vertical length of a contact surface on an outside of the first flange portion of the first lens that is in contact with the inner surface of the lens barrel is 70% or more of the total thickness of the first flange portion.

13. The camera module of claim 1, wherein a refractive index of the third lens is lower than a refractive index of the first lens, wherein a vertical length of the second contact surface is 20% to 50% of the total thickness of the third flange portion of the third lens, wherein a radius of curvature of an object-side fifth surface of the third lens and a radius of curvature of a sensor-side sixth surface of the third lens are 1.0 mm or more, and wherein a center of the second contact surface is located closer to a side having a greater radius of curvature among the object-side fifth surface of the third lens and the sensor-side sixth surface of the third lens based on a center of the total thickness of the third flange portion of the third lens and the radii of curvature of the fifth and sixth surfaces are expressed as absolute values.

14. A camera module comprising:

a lens barrel having a through hole therein; and a first lens, a second lens, and a third lens coupled to the through hole of the lens barrel and aligned with an optical axis from an object side toward a sensor side, wherein lenses of the optical system consist of three lenses, wherein the first lens is made of a glass material, wherein the second lens is made of a plastic material, wherein the first lens includes a first flange portion and an object-side first surface and a sensor-side second surface.

wherein the second lens includes a second flange portion extending from the optical axis toward an inner surface of the lens barrel, wherein the third lens includes a third flange portion extending from the optical axis toward the inner surface of the lens barrel, wherein the second flange portion includes a first contact surface (S21) that is disposed in parallel to the optical axis and contacts the inner surface of the lens barrel, and a first non-contact surface (S22) that is disposed in parallel to the optical axis and does not contact the inner surface of the lens barrel, wherein the third flange portion includes a second contact surface (S31) that is disposed in parallel to the optical axis and contacts the inner surface of the lens barrel, and a second non-contact surface (S32) that is disposed in parallel to the optical axis and does not contact the inner surface of the lens barrel, wherein a vertical length (D5) of the first non-contact surface in a direction of the optical axis is longer than a vertical length (T5) of the second non-contact surface, wherein a total thickness (D1) of the second flange portion is thicker than a total thickness (T1) of the third flange portion, and wherein a MTF change rate is 10% or less at high temperature compared to room temperature, where the room temperature is 20° C. to 30° C., and the high temperature is 80° C. to 105° C.

15. The camera module of claim 14, wherein an object-side third surface and a sensor-side fourth surface of the second lens have different radii of curvature on the optical axis, and wherein a center of the first contact surface is located closer to a side having a greater radius of curvature among the third surface and the fourth surface based on a center of the thickness of the second flange portion of the second lens, and the radii of curvature of the third and fourth surfaces are expressed as absolute values.

16. The camera module of claim 14, wherein a diameter of the first lens is smaller than a diameter of the second lens.

17. The camera module of claim 14, wherein the third lens is made of a plastic material, wherein a vertical length of the second contact surface is 20% to 50% of a the total thickness of the third flange portion of the third lens, wherein an object-side fifth surface and a sensor-side sixth surface of the third lens have different radii of curvature, wherein the radius of curvature of the object-side fifth surface of the third lens and the radius of curvature of the sensor-side sixth surface of the third lens are 1.0 mm or more, and wherein a center of the second contact surface is located closer to a side having a greater radius of curvature among the object-side fifth surface of the third lens and the sensor-side sixth surface of the third lens based on a center of the total thickness of the third flange portion of the third lens, and the radii of curvature of the fifth and sixth surfaces are expressed as absolute values.

18. The camera module of claim 14, wherein the third surface of the second lens has a concave shape on the optical axis, and wherein the fourth surface of the second lens has a convex shape on the optical axis.

19. The camera module of claim 14, wherein an object-side fifth surface of the third lens has a convex shape on the optical axis, wherein a sensor-side sixth surface of the third lens has a concave shape on the optical axis, wherein the third lens is made of a plastic material, wherein a diameter of the second lens is larger than a diameter of the first lens, and wherein a diameter of the third lens is larger than the diameter of the second lens.

20. The camera module of claim 14, wherein a vertical length of a contact surface on an outside of the first flange portion of the first lens that is in contact with the inner surface of the lens barrel is 70% or more of the total thickness of the first flange portion.

* * * * *